(12) United States Patent
Vilcinskas et al.

(10) Patent No.: US 11,416,564 B1
(45) Date of Patent: Aug. 16, 2022

(54) WEB SCRAPER HISTORY MANAGEMENT ACROSS MULTIPLE DATA CENTERS

(71) Applicant: Metacluster LT, UAB, Vilnius (LT)

(72) Inventors: Eivydas Vilcinskas, Siauliai (LT); Arnas Petruskevicius, Vilnius (LT); Giedrius Stalioraitis, Vilnius (LT); Martynas Juravicius, Vilnius (LT); Rimantas Stankevicius, Vilnius (LT)

(73) Assignee: Metacluster LT, UAB, Vilnius (LT)

( * ) Notice: Subject to any disclaimer, the term of this patent is extended or adjusted under 35 U.S.C. 154(b) by 0 days.

(21) Appl. No.: 17/373,634

(22) Filed: Jul. 12, 2021

Related U.S. Application Data

(60) Provisional application No. 63/219,660, filed on Jul. 8, 2021.

(51) Int. Cl.
*G06F 16/951* (2019.01)
*G06F 16/953* (2019.01)

(52) U.S. Cl.
CPC .......... *G06F 16/951* (2019.01); *G06F 16/953* (2019.01)

(58) Field of Classification Search
CPC .............................. G06F 16/951; G06F 16/953
USPC .......................................................... 707/707
See application file for complete search history.

(56) References Cited

U.S. PATENT DOCUMENTS

| | | | | |
|---|---|---|---|---|
| 9,594,759 B2* | 3/2017 | Murphy | ............... | G06F 16/113 |
| 9,633,378 B1* | 4/2017 | Nath | ............... | G06F 16/951 |
| 10,817,914 B1* | 10/2020 | Nath | ............... | G06Q 30/0277 |
| 2010/0070448 A1* | 3/2010 | Omoigui | ............. | H01L 27/1463 706/47 |
| 2010/0278453 A1* | 11/2010 | King | ............... | G06F 40/169 382/321 |
| 2012/0190386 A1* | 7/2012 | Anderson | ............... | G01S 19/14 455/456.3 |
| 2014/0075004 A1* | 3/2014 | Van Dusen | ............. | H04L 41/04 709/223 |
| 2014/0201126 A1* | 7/2014 | Zadeh | ............... | A61B 5/165 706/52 |
| 2017/0228797 A1* | 8/2017 | Nath | ............... | G06Q 30/0276 |
| 2018/0204111 A1* | 7/2018 | Zadeh | ............... | G06N 3/0436 |
| 2018/0373507 A1* | 12/2018 | Mizrahi | ............... | G06F 8/36 |
| 2020/0184278 A1* | 6/2020 | Zadeh | ............... | G06F 16/953 |

* cited by examiner

*Primary Examiner* — Mark E Hershley
(74) *Attorney, Agent, or Firm* — Sterne, Kessler, Goldstein & Fox P.L.L.C

(57) ABSTRACT

Embodiments disclose a system that allows for improved generation of web requests for scraping that, because of the nature of the requests and time and manner they are sent out, appear more organic, as in human generated, than conventional automated scraping systems. The system then manages how a client request to scrape a target website is made to the site, masking the request in a manner that makes it appear to the Web server as if the request is not generated by an automated system. In this way, by appearing more organic, Web servers may be less likely to block requests from the disclosed system or may take longer to block requests from the disclosed system. By avoiding Web servers blocking requests and extending the lifetime of IP proxies before they are blocked, embodiments can use a limited IP proxy address space more efficiently.

20 Claims, 18 Drawing Sheets

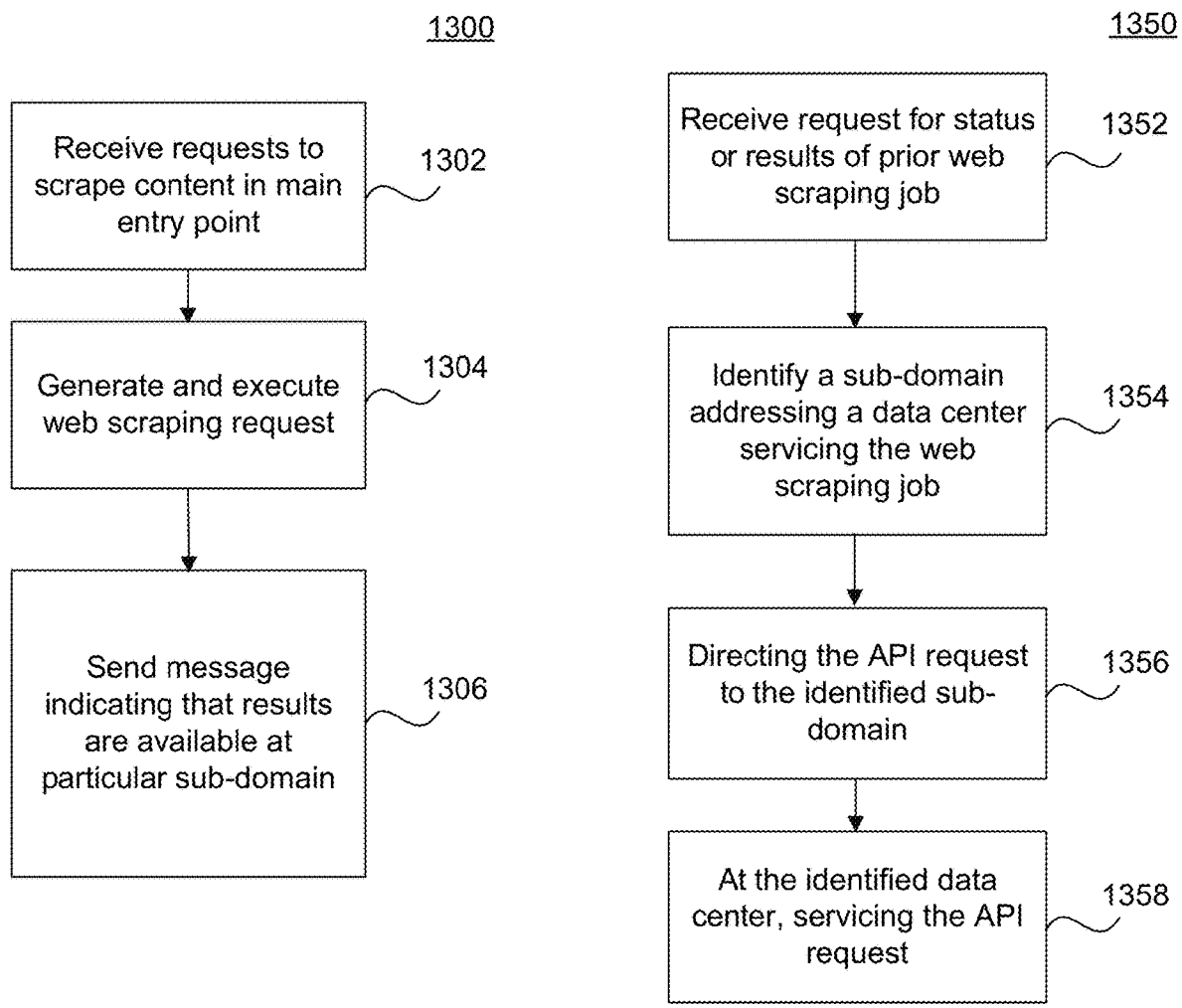

WEB SCRAPER HISTORY MANAGEMENT ACROSS MULTIPLE DATA CENTERS

BACKGROUND

Field

This field is generally related to web scraping.

Related Art

Web scraping (also known as screen scraping, data mining, web harvesting) is the automated gathering of data from the Internet. It is the practice of gathering data from the Internet through any means other than a human using a web browser. Web scraping is usually accomplished by executing a program that queries a web server and requests data automatically, then parses the data to extract the requested information.

To conduct web scraping, a program known as a web crawler may be used. A web crawler, sometimes called a web spider, is a program or an automated script which performs the first task, i.e. it navigates the web in an automated manner to retrieve data, such as Hypertext Transfer Markup Language (HTML) data, JSONs, XML, and binary files, of the accessed websites.

Web scraping is useful for a variety of applications. In a first example, web scraping may be used for search engine optimization. Search engine optimization (SEO) is the process of improving the quality and quantity of website traffic to a website or a web page from search engines. A web search engine, such as the Google search engine available from Google Inc. of Mountain View, Calif., has a particular way of ranking its results, including those that are unpaid. To raise the location of a website in search results, SEO may, for example, involve cross-linking between pages, adjusting the content of the website to include a particular keyword phrase, or updating content of the website more frequently. An automated SEO process may need to scrape search results from a search engine to determine how a website is ranked among search results.

In a second example, web scraping may be used to identify possible copyright. In that example, the scraped web content may be compared to copyrighted material to automatically flag whether the web content may be infringing a copyright holder's rights. In one operation to detect copyright claims, a request may be made of a search engine, which has already gathered a great deal of content on the Internet. The scraped search results may then be compared to a copyrighted work.

In a third example, web scraping may be useful to check placement of paid advertisements on a webpage. For example, many search engines sell keywords, and when a search request includes the sold keyword, they place paid advertisements above unpaid search results on the returned page. Search engines may sell the same keyword to various companies, charging more for preferred placement. In addition, search engines may segment as sales by geographic area. Automated web scraping may be used to determine ad placement for a particular keyword or in a particular geographic area.

In a fourth example, web scraping may be useful to check prices or products listed on e-commerce websites. For example, a company may want to monitor a competitor's prices to guarantee that their prices remain competitive.

To conduct web scraping, the web request may be sent from a proxy server. The proxy server then makes the request on the web scraper's behalf, collects the response from the web server, and forwards the web page data so that the scraper can parse and interpret the page. When the proxy server forwards the requests, it generally does not alter the underlying content, but merely forwards it back to the web scraper. A proxy server changes the request's source IP address, so the web server is not provided with the geographical location of the scraper. Using the proxy server in this way can make the request appear more organic and thus ensure that the results from web scraping represent what would actually be presented were a human to make the request from that geographical location.

Proxy servers fall into various types depending on the IP address used to address a web server. A residential IP address is an address from the range specifically designated by the owning party, usually Internet service providers (ISPs), as assigned to private customers. Usually a residential proxy is an IP address linked to a physical device, for example, a mobile phone or desktop computer. However, businesswise, the blocks of residential IP addresses may be bought from the owning proxy service provider by another company directly, in bulk. Mobile IP proxies are a subset of the residential proxy category. A mobile IP proxy is one with an IP address that is obtained from mobile operators. Mobile IP proxies use mobile data, as opposed to a residential proxy that uses broadband ISPs or home Wi-Fi. A datacenter IP proxy is the proxy server assigned with a datacenter IP. Datacenter IPs are IPs owned by companies, not by individuals. The datacenter proxies are typically IP addresses that are not in a natural person's home.

Exit node proxies, or simply exit nodes, are gateways where the traffic hits the Internet. There can be several proxies used to perform a user's request, but the exit node proxy is the final proxy that contacts the target and forwards the information from the target to a user device, perhaps via a previous proxy. There can be several proxies serving the user's request, forming a proxy chain, passing the request through each proxy, with the exit node being the last link in the chain that ultimately passes the request to the target.

E-commerce and search engine sites may prefer not to service web scraping requests or may try to limit web scraping requests. To that end, these sites may try to determine which of the requests it receives are automated and which requests are in response to a human web browsing request. When a web server identifies a request that the server believes to be automated, the server may block all requests coming from that proxy or requests having certain parameters from that proxy.

To identify which requests are automated, a web server may try to determine whether web requests coming from a particular IP address or subnet satisfy a pattern over time. To avoid detection, proxies may be rotated so that no single IP address makes too many requests. However, the supply of proxy IP addresses is limited. The IP address space (especially in IP version 4) in general is constrained. This limited supply is exasperated because many of the available IP addresses are labeled as data center IPs, and many target websites likely to be scraped refuse to service web requests from those IP addresses. As a result of the limited supply, the cost of obtaining a proxy IP address has increased. Taking proxy IP addresses out of circulation too quickly raises the cost of web scraping.

Systems and methods are needed for improved web scraping.

BRIEF SUMMARY

In an embodiment, a method is provided for aggregating web results scraped from a plurality of data centers. In the method, at respective first and second data centers of the plurality of data centers, requests for a target website are generated and transmitted. In response to the web requests, content from the target website is received at each of the data centers. The content received at the respective data centers is stored in an archive. Metadata for the respective content are stored in entries in index files at the respective data centers. A search request from a client is analyzed to determine whether search criteria in the search request describes the metadata in the index files across the various data centers. Based on the analysis, a file with links to the content is provided to the client.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 13A-B illustrate methods for operation of the systems in FIGS. 12A-B.

The drawing in which an element first appears is typically indicated by the leftmost digit or digits in the corresponding reference number. In the drawings, like reference numbers may indicate identical or functionally similar elements.

DETAILED DESCRIPTION

Figure 1:
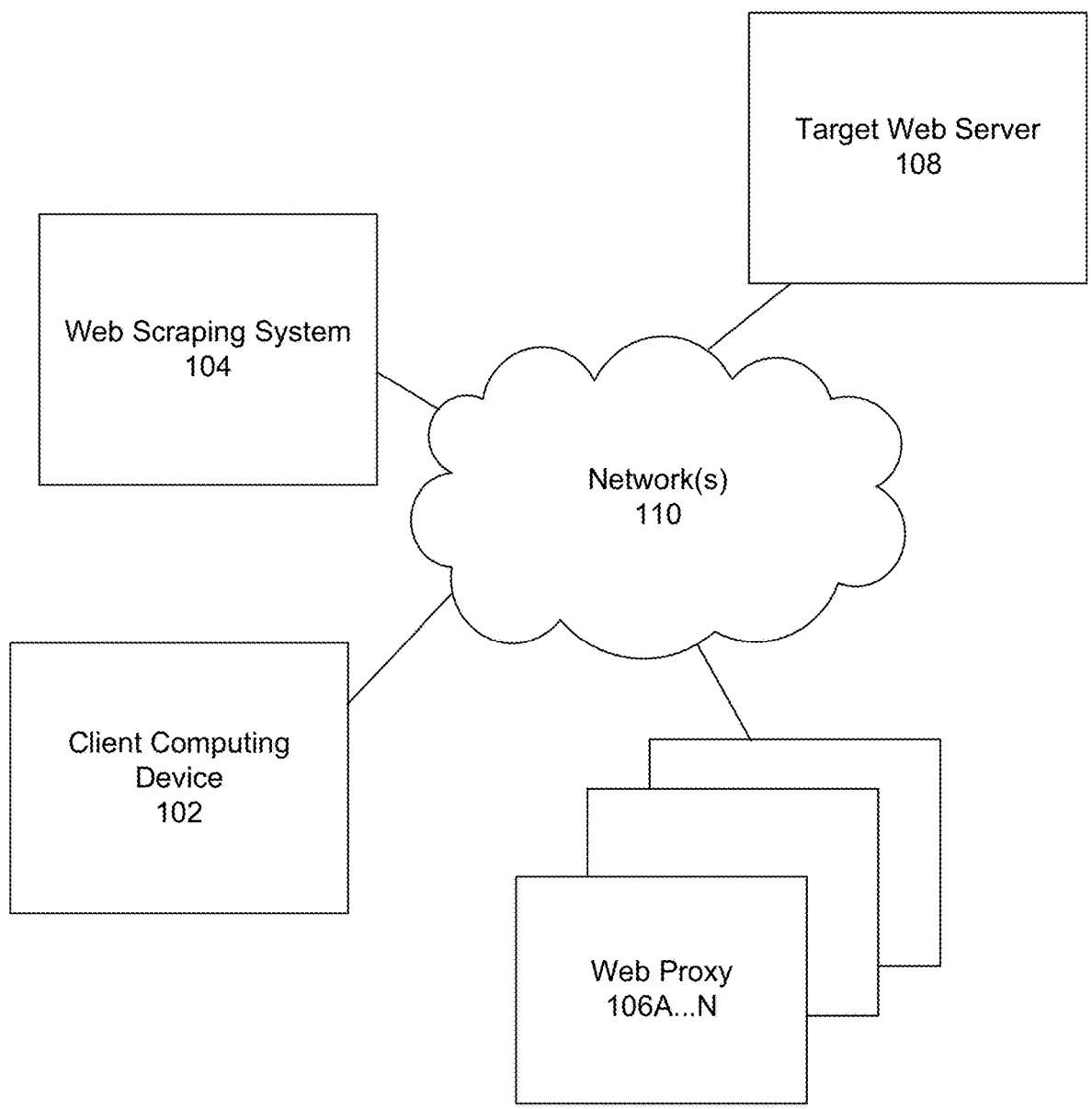
FIG. 1 is an architecture diagram illustrating a system that allows a client to scrape web content through a proxy.

Embodiments disclose a system that allows for improved generation of web requests for scraping that, because of the nature of the requests and the time and manner in which they are sent out, appear more organic, as in "human generated," than conventional automated scraping systems. In an example operation, a client may send a request to the system to scrape a particular site. Within the parameters the client provides, the system then manages how the request is made to the site, masking the request in a manner that makes it appear to the web server as if the request is not generated by an automated system. In this way, by making the request appear more organic, web servers may be less likely to block requests from the disclosed system or may take longer to block requests from the disclosed system. By avoiding web servers blocking requests and extending the lifetime of IP proxies before they are blocked, embodiments can use a limited IP proxy address space more efficiently. Aspects of a web scraping system that makes scraping requests through proxies are described with respect to FIGS. 1-4.

For various applications, clients may require automated scraping of web content.

Some websites try to block requests that the websites believe to be automated. To determine whether requests are automated, these websites look at patterns of requests received over time from particular sources. For that reason, sources can be used to originate automated requests for web content only so frequently before the websites requested begin to recognize that the requests are automated. In part, to deal with this, embodiments throttle requests on a per-client basis. Throttling involves queuing requests from a client and executing requests from the queue on a periodic basis. In one example embodiment, a queue may be specific to a particular client, a target, and as to whether the request was made through a headless browser. Aspects of throttling web scraping requests are described with respect to FIGS. 5-7.

Traditionally, proxy web scraping services may have tracked user activity on by tracking a number of requests made for invoicing purposes. According to embodiments, user activity for proxy web based scraping services is tracked based on network traffic generated. In particular, when a response is received to a web scraping request, the amount of data transferred over a physical network layer may be calculated. Depending on product, pricing plan and possibly other parameters, the request might be counted as well. To calculate the amount of data, an adjustment may be made to the total amount of data received to account for compression that occurs when the data is transferred. In addition, the amount of data may exclude requests and responses needed to acquire session information to request the scraped traffic. Aspects of tracking network traffic generated by web scraping requests are described with respect to FIGS. 8-9.

Requests for web scraping may be placed in a database while they are being executed. The database may hold status information pertinent to the request. To store and provision data, a plurality of database servers, sometimes called shards, may be used. When an update or query is made to the database, the update or query may be sent to the database server which stores the database for update or data queried.

Sometimes, database servers can become overwhelmed or otherwise hung up. According to an embodiment, "heartbeats" are periodically sent to the database servers to determine which ones are available and which ones may have issues. A shared memory location may be used where the status of a shard could be indicated to be unavailable. Based on that information, new requests for web scraping may be sent to those database servers determined to be available and not to those determined to be unavailable. There is a shared memory location where the status of a shard could be indicated to be unavailable, but the "heartbeat" is still carried out by each of the user services. Aspects of this database server management technique are described below with respect to FIGS. 10-11.

A web scraping service may include a plurality of web scraping servers and a load balancing server to distribute load between the plurality of web scraping servers. The web scraping servers are configured to register and conduct web scraping requests. When a new request is received, the load balancing server determines which of the plurality of web scraping servers conduct the request. Each of the plurality of web scraping servers may be located in a different data center location. The new request for web scraping is directed to a data center determined by a load-balancing server. To retrieve the results of the web scraping, a client may send a subsequent request. According to an embodiment, the load balancing server may determine which of the plurality of data centers executed the original request. Then, the load balancing server may direct the subsequent request to the same data center. In this way, data can be more efficiently retrieved from the same data center that serviced the web scraping request. Aspects of this direct data center access are described below with respect to FIGS. 12A-B and 13A-B.

A web scraping service may include a plurality of web scraping servers and a load balancing server. The web scraping servers are configured to register and conduct web scraping requests. When a new request is received, the load balancing server determines which of the plurality of web scraping servers conduct the request. Authentication needs to be conducted to determine whether the request is authorized. According to an embodiment, the load balancing server accesses an authentication server that assesses credentials provided with an API request to determine whether the credentials are valid. When the credentials are valid, the authentication server returns to the load balancing server, a token, indicating the user's identity and role. The load balancing server then forwards the token along with the request to the website scraping server, and the website scraping server uses the token to verify that the request is authorized. Aspects of this token-based authentication are described below with respect to FIGS. 14 and 15.

Web scraping services can keep a history of web pages previously scraped. The history may be stored by a plurality of data centers, each maintaining their own index. When a request to look up previously scraped webpages is received, the various indexes stored across multiple data centers are assessed and the results from the respective data centers are combined. In a further embodiment, web scraping results are de-duplicated across multiple data centers. This operation of an archive of web scraping results across multiple data centers is described with respect to FIGS. 16 and 17.

Automated Web Scraping Through Proxies

FIG. 1 is an architecture diagram illustrating a system 100 that allows a client to scrape web content through proxy. System 100 includes a client computing device 102, web scraping system 104, a plurality of web proxies 106A . . . N, and a target web server 108. Each of these components include one or more computing devices and are connected through one or more networks 110.

Client computing device 102 is a computing device that initiates requests to scrape content from the web, in particular target web server 108. As described above, client computing device 102 may seek to scrape content for various applications. For example, client computing device 102 may have or interact with software to engage in search engine optimization. Client computing device 102 may be analyzing ad placement or e-commerce products or listed prices. Client computing device 102 sends a request to web scraping system 104. The request can be synchronous or asynchronous and may take a variety of formats as described in more detail with respect to FIG. 2.

Web scraping system 104 develops a request or a sequence of requests that impersonate a human using a web browser. To impersonate non-automated requests to a target website, web scraping system 104 has logic to formulate Hypertext Transfer Protocol (HTTP) requests to the target website. Still further, many of these sites require HTTP cookies from sessions generated previously. An HTTP cookie (usually just called a cookie) is a simple computer data structure made of text written by a web server in previous request-response cycles. The information stored by cookies can be used to personalize the experience when using a website. A website can use cookies to find out if someone has visited a website before and record data about what they did. When someone is using a computer to browse a website, a personalized cookie data structure can be sent from the website's server to the person's computer. The cookie is stored in the web browser on the person's computer. At some time in the future, the person may browse that website again. When the website is found, the person's browser checks whether a cookie for that website is found and available. If a cookie is found, then the data that was stored in the cookie before can be used by the website to tell the website about the person's previous activity. Some examples where cookies are used include shopping carts, automatic login, and remembering which advertisements have already been shown.

Additionally or alternatively, the second request may be generated from other data received in response to the first request, besides cookies. For example, the other data can include other types of headers, parameters, or the body of the response.

Because many websites require session information, usually stored in cookies but possibly received in other data from previously visited retrieved pages, web scraping system 104 may reproduce a series of HTTP requests and responses to scrape data from the target website. For example, to scrape search results, embodiments described herein may first request the page of the general search page where a human user would enter her search terms in a text box on an HTML page. If it were a human user, when the user navigates to that page, the resulting page would likely write a cookie to the user's browser and would present an HTML page with the text box for the user to enter her search terms. Then, the user would enter the search terms in the text box and press a "submit" button on the HTML page presented in a web browser. As a result, the web browser would execute an HTTP POST or GET operation that results in a second HTTP request with the search term and any resulting cookies. According to an embodiment, the system disclosed here would reproduce both HTTP requests, using data, such as cookies, other headers, parameters or data from the body, received in response to the first request to generate the second request.

In embodiments, the system may be able to simulate a request sent from a particular geographic location. One way to do this is to select a proxy from a particular geographic location. However, one issue with this is that there may not be sufficient proxy IP addresses available in every location of interest. As proxy IP addresses become exhausted and are blocked by target websites, the supply of proxy IP addresses, in particular, geographic locations, may become limited or even exhausted.

Many sites provide another way for a browser to identify a geolocation in the HTTP request. In those sites, the IP address may not be the only source of location information. A browser may have settings and a user profile that enable a user to allow the browser to send location information. The location information is information describing the location of the device sending the HTTP request, for example, a GPS location detected by a GPS receiver on a mobile device. The browser may provide the location information in the HTTP request. In one example, the location may be embedded in header information in the HTTP request such as in a cookie.

The headers can also contain identification of the user agent. For example, they can include an identification of a type of browser being used. In this way, a web server can customize a response based on the user agent being used to access the content. For example, a site might look different on a mobile browser than on a desktop browser. Sometimes, websites may only support certain types of browsers. Browsers might have different features available to them, and when a website recognizes from the HTTP header, information that the request came from a browser lacking the necessary features for the website, the site may refuse to respond with the requested page.

According to embodiments, web scraping system 104 can mimic this transmission of location information without using the actual browser. For example, the system can embed location information in headers of the HTTP requests sent to the target website. In this way, web scraping system 104 may be able to formulate a localized request, even when a proxy IP address located in the desired region may be unavailable.

Further description of how web scraping system 104 may formulate the series of requests needed to obtain the desired content is provided below in FIG. 2. Once web scraping system 104 formulates an HTTP request, it sends the request to a web proxy 106A . . . N.

Web proxy 106A . . . N are each a server that acts as an intermediary for requests from clients seeking resources from servers that provide those resources. Web proxy 106A . . . N thus functions on behalf of the client when requesting service, potentially masking the true origin of the request to the resource server.

In FIG. 1, at least one of web proxy 106A . . . N accepts a request from web scraping system 104. The request is in a proxy protocol format. The at least one web proxy 106A . . . N that accepts the request forwards the request to target web server 108. In forwarding the request, the web proxy 106A . . . N assigns its own IP address as the source IP address for packets encapsulating the HTTP request. The destination IP address for any packets encapsulating the HTTP request is the IP address of target web server 108. Because the source IP address was the web proxy 106A . . . N, target web server 108 may not be able to determine that the request originated from web scraping system 104. Once target web server 108 generates a response to the request, target web server 108 sends the response back to the web proxy 106A . . . N that forwarded the request, which in turn forwards the response to web scraping system 104.

Target web server 108 is computer software and underlying hardware that accepts requests and returns responses via HTTP. As input, target web server 108 typically takes the path in the HTTP request, any headers in the HTTP request, and sometimes a body of the HTTP request, and uses that information to generate content to be returned. The content served by the HTTP protocol is often formatted as a webpage, such as using HTML and JavaScript.

Figure 2:
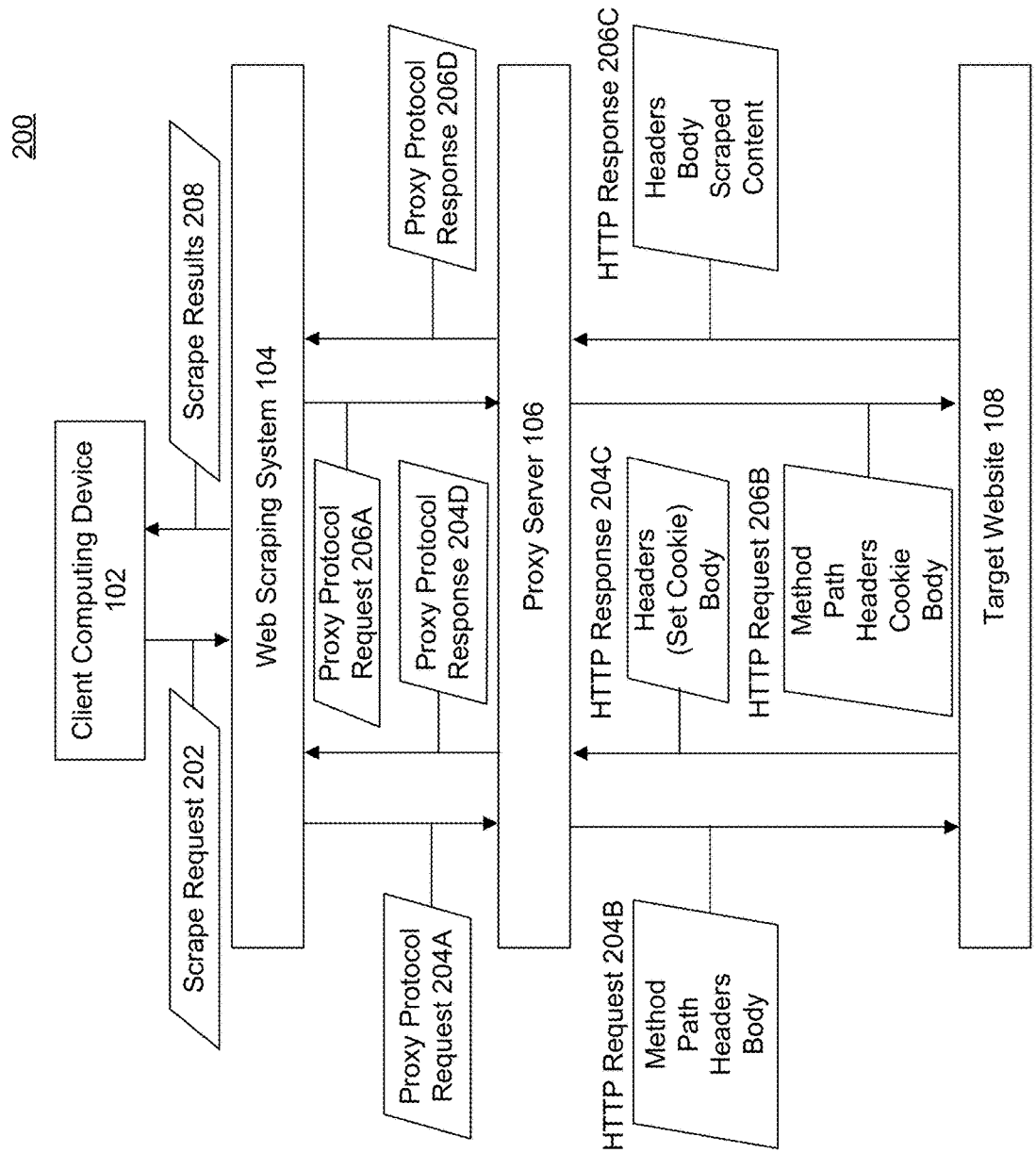
FIG. 2 illustrates an example operation of the system in FIG. 1 and provides further description of how the system's components may interact.

FIG. 2 includes a diagram 200 that illustrates an example operation of system 100 in FIG. 1 and provides further description of how components of system 100 may interact.

As illustrated in diagram 200, to request that web content to be scraped, client computing device 102 sends a scrape request 202 to web scraping system 104. In response to scrape request 202, web scraping system 104 initiates a series of operations and transactions needed to scrape the results. In diagram 200, the transactions are labeled as messages 204A-D and 206A-D. After the results are scraped, web scraping system 104 provides the retrieved content back to client computing device 102 as scraped results 208.

In an embodiment, web scraping system 104 may cache scraped data. For example, when a request to scrape is received from a client, the system may determine whether the website targeted has been scraped within a certain time, such as within the last day. If the website has been scraped recently, e.g., within the certain time period, the system may return the previously scraped results.

Client computing device 102 interacts with web scraping system 104 in various ways. In an embodiment, a client may send scrape request 202 with the parameters describing the web scraping sought to be completed. The request and its parameters may conform to an API set forth by system 104. The parameters may include a Uniform Resource Locator (URL), Uniform Resource Identifier (URI), header information, geolocation information, and browser information, and other values listed in greater detail below with respect to FIG. 3. In response to the request, system 104 will return an acknowledgment that the request is received. The acknowledgment may include a message indicating that the scraped results will be available at a particular location. The system queues the request and, when the scraped results are retrieved, a message, also called a callback, may be sent to client 102 indicating that scraped results 208 are available. In this way, system 104 can asynchronously service a client request for the scrape data.

Alternatively or additionally, client 102 may send the request, as described above, but instead of returning an acknowledgment, system 104 may keep the connection with client 102 open while the scraping is being conducted. Once the scraping is completed, the results are returned in a response to the initial request. In this way, system 104 can synchronously service a client request for the scrape data.

Alternatively or additionally, the request may service requests formatted according to a proxy protocol. The proxy protocol may be the same protocol used by proxy server 106 to accept and respond to requests. In diagram 200, such requests are labeled proxy protocol request 204A and 206A and proxy protocol responses 204D and 206D. Examples of a proxy protocol include the HTTP proxy protocol and a SOCKS protocol.

When web scraping system 104 receives scrape request 202, web scraping system 104 determines the necessary transactions needed to scrape the requested content. As mentioned above, because of state variables expected from target website 108, to scrape the requested content, multiple transactions with target website 108 may be necessary. In the example in diagram 200, two transactions are shown, but more or less may be needed. For each transaction, web scraping system 104 needs to determine all the parameters for an HTTP request and format the HTTP request accordingly.

The logic necessary to determine the series of the transactions and corresponding HTTP requests may be preprogrammed for each target website. When scraping API request 202 is received, web scraping system 104 looks at the needed logic and generates the transactions and corresponding HTTP request accordingly. In addition, the logic describing the sequence of HTTP requests to reach a target website may be stored in advance. When a customer request is received to scrape a target website, the logic necessary to reach the target website is retrieved and executed, resulting in a series of HTTP requests being sent and HTTP responses being received.

In diagram 200, the HTTP requests to target website 108 are HTTP request 204B and HTTP request 206B. As described above, web scraping server 104 may not send the requests directly to target website 108 and instead send them through at least one intermediary proxy server 106. To send the request to proxy server 106, a proxy protocol may be used.

To send a request according to an HTTP proxy protocol, the full URL may be passed, instead of just the path. Also, credentials may be required to access the proxy. All the other fields for an HTTP request must also be determined. To reproduce an HTTP request, web scraping system 104 will generate all the different components of each request, including a method, path, a version of the protocol that the request wants to access, headers, and the body of the request.

An illustrative example of proxy protocol request 204A is reproduced below:
GET https://www.searchengine.com/HTTP/1.1
Proxy-Authorization: Basic encoded-credentials
Accept: text/html
User-Agent: Mozilla/5.0
Cookie: Location=Alexandria, Va., USA;

In the above example, the HTTP method invoked is a GET command, and the version of the protocol is "HTTP/1.1." The path is "https://www.searchengine.com/," and because it includes a full URL as opposed to URI, it may signify to web proxy 106 that the HTTP request is for a proxy request. The body of the request is empty.

The example HTTP proxy protocol request 204A includes four headers: "Proxy-Authorization," "Accept," "User-Agent," and "Cookie." The "Proxy-Authorization" header provides authorization credentials for connecting to a proxy. The "Accept" header provides media type(s) that is/are acceptable for the response. The "User Agent" header provides a user agent string identifying the user agent. For example, the "User Agent" header may identify the type of browser and whether or not the browser is a mobile or desktop browser. The "Cookie" header is an HTTP cookie previously sent by the server with Set-Cookie (below). In this case, the server may be set up to previously have saved the location of the user. Thus, if the user had previously visited the server from Alexandria, Va., the server would, for example, save "Alexandria, Va., USA" as a cookie value. By sending such a cookie value with the request, web scraping system 104 can simulate the geolocation without having previously visited the location and without needing a proxy IP address located in Alexandria, Va.

System 104 may profile these values, the HTTP headers and the path (e.g., "https://www.searchengine.com/" v. "https://www.searchengine.com/en/"), to resemble requests that would be plausibly generated by a browser controlled by a human. In this way, system 104 may generate the HTTP requests to avoid the target web server being able to detect that the requests are automatically generated from a bot.

The HTTP proxy protocol is one example of how the proxy protocol may operate. In another example, HTTP tunneling may be used, using, for example, the HTTP CONNECT command. In still another example, the proxy may use a SOCKS Internet protocol. While the HTTP proxy protocol operates at the application layer of the OSI model protocol stack, SOCKS may operate at the session layer (layer 5 of the OSI model protocol stack). Other protocols may be available forwarding data at different layers of the network protocol stack.

When proxy server 106 receives proxy protocol request 204A, it sends a corresponding HTTP request 204B to target website 108. Continuing the example above, the target website 108 may be a web server addressed by the hostname "www.searchengine.com." In this example, HTTP request 204B may be:
GET/HTTP/1.1
Accept: text/html
User-Agent: Mozilla/5.0
Cookie: Location=Alexandria, Va., USA;

In response, target website 108 will return an HTTP response with the website located at its path "/". The website may be customized according to the headers, for example, it may be customized according to the location information and user agent information in the headers of HTTP request 204B.

Continuing the example above, HTTP response 204C may be as follows:
HTTP/1.1 200 OK
Content-Type: text/html
Set-Cookie: Location=Alexandria, Va., USA; session-id="1234567890abcdef"
<!DOCTYPE html>
<body>
<h1>Search Query</h1>
  <form action="/search">
    <input type="text" id="query" name="query">
    <input type="submit" value="Submit">
  </form>
</body>
</html>

In that example, again, HTTP response 204C can include an indication of the version of the protocol used (here, "HTTP/1.1"), a status code indicating if the request is successful or not (here, "200"), a status message with a non-authoritative short description of the status code (here, "OK"). HTTP response 204C can also include headers and a body.

Here, the headers include a "Content-Type" header which includes a MIME (Multipurpose Internet Mail Extensions) type of this content and a "Set-Cookie" header that sets cookies to be transmitted with the next request to target website 108. In this case, the "Set-Cookie" header keeps the geolocation information previously transmitted and adds a "session ID." Target website 108 may expect the session ID to be returned to it in further requests. In this way, target website 108 can track sessions and maintain the state across multiple request-response cycles.

The body of HTTP response 204C in the example above is a simple HTML page. If the HTML page were rendered in a browser, the browser would present a form providing a search text box field and a submit button. When the submit button is selected, the browser would submit another request to the URI "/search" carrying, as is parameter, the input in the text field.

Target website 108 sends HTTP response 204C to proxy server 106. In response to receipt of HTTP response 204C, proxy server 106 sends a proxy protocol response 204D. Proxy protocol response 204D may be formatted according to the proxy protocol as described above. In an example, the proxy protocol response 204D may be similar or identical to HTTP response 204C.

On receipt of proxy protocol response 204D, web scraping system 104 then generates the next request in the sequence or requests needed to retrieve the requested content. In diagram 200 the next request is proxy protocol request 206A. Proxy protocol request 206A is generated to simulate a request that would be generated had a user on a browser entered in the desired search terms in the search field and pressed submit.

Continuing the example above, scrape request 202 may instruct web scraping system 104 to scrape search results for the search term "CompanyA." Moreover, web scraping system 104 will generate proxy protocol response 206A to include the cookie and session information provided from the previous transaction. In that case, proxy protocol response 206A may be as follows:

GET https://www.searchengine.com/search?query=CompanyA HTTP/1.1
Proxy-Authorization: Basic encoded-credentials
Accept: text/html
User-Agent: Mozilla/5.0
Cookie: Location=Alexandria, Va., USA; session-id="1234567890abcdef"

The path specified proxy protocol response 206A includes a complete URL of the destination sought from target website 108. It includes target website 108's hostname "www.searchengine.com." It also includes the path within target website 108 that is sought in this case "/search?query=CompanyA." The first part of the path "/search" is specified by the submit button in the HTML form included in HTTP response 204C. The name of the parameter submitted "query" is also specified by the text field element in the HTML form included in HTTP response 204C. As described above with respect to proxy protocol request 204A and proxy protocol response 204D, this is one example; other protocols to establish a proxy relationship may be used.

When proxy server 106 receives proxy protocol request 206A from web scraping system 104, it generates a corresponding HTTP request 206B and sends HTTP request 206B to target website 108. Proxy server 106 generates HTTP request 206B in a similar manner to what was described above with respect to HTTP request 204B. Continuing the running example, HTTP request 206B sent to target website 108 may be:

GET/search?query=CompanyA HTTP/1.1
Proxy-Authorization: Basic encoded-credentials
Accept: text/html
User-Agent: Mozilla/5.0
Cookie: Location=Alexandria, Va., USA; session-id="1234567890abcdef"

Based on HTTP request 206B, target website 108 generates HTTP response 206C. Target website 108 may generate a page corresponding to the path requested, including the parameters included in the path (here, "/search?query=CompanyA"). Commonly, target website 108 will generate such a page dynamically checking databases, perhaps running computations, and formatting results accordingly. Continuing the example above, HTTP response 206C may be:

HTTP/1.1 200 OK
Content-Type: text/html
<!DOCTYPE html>
<body>
<h1>Search Results</h1>
<p> <a href="https://www.companya.com">CompanyA</a> </p>
<p> <a href="https://www.companyb.com">CompanyB</a> </p>
<p> <a href="https://www.companyc.com">CompanyC</a> </p>
</body>
</html>

Similar to HTTP response 204C, HTTP response 206C includes the protocol version, a status code, a status message, headers, and a body. The body of HTTP response 206C in the example above is a simple HTML page. If the HTML page were rendered in a browser, the browser would present listing of search results, with each search result having a corresponding link. A result "CompanyA" linked to the URL "https://www.companya.com" would be presented first. This HTML page is the content sought to be scraped by client computing device 102.

Target website 108 returns HTTP response 204C to proxy server 106. As described above with respect to proxy protocol response 204D, proxy server 106 generates proxy protocol response 206D based on HTTP response 206C. Proxy protocol response 206D includes the scraped content. Proxy server 106 sends proxy protocol response 206D to web scraping system 104.

Based on and in response to proxy protocol response 206D, web scraping system 104 generates and sends scraped results 208 to client computing device 102. As described above, web scraping system 104 may send the scraped content, in this case the HTML page within HTTP response 206C, directly to client computing device 102 within the scraped results 208. Alternatively or additionally, web scraping system 104 may parse relevant information from the HTML, page and send the parsed information to client computing device 102 in scraped results 208.

Components and Operation of an Automated Web Scraping System

Figure 3:
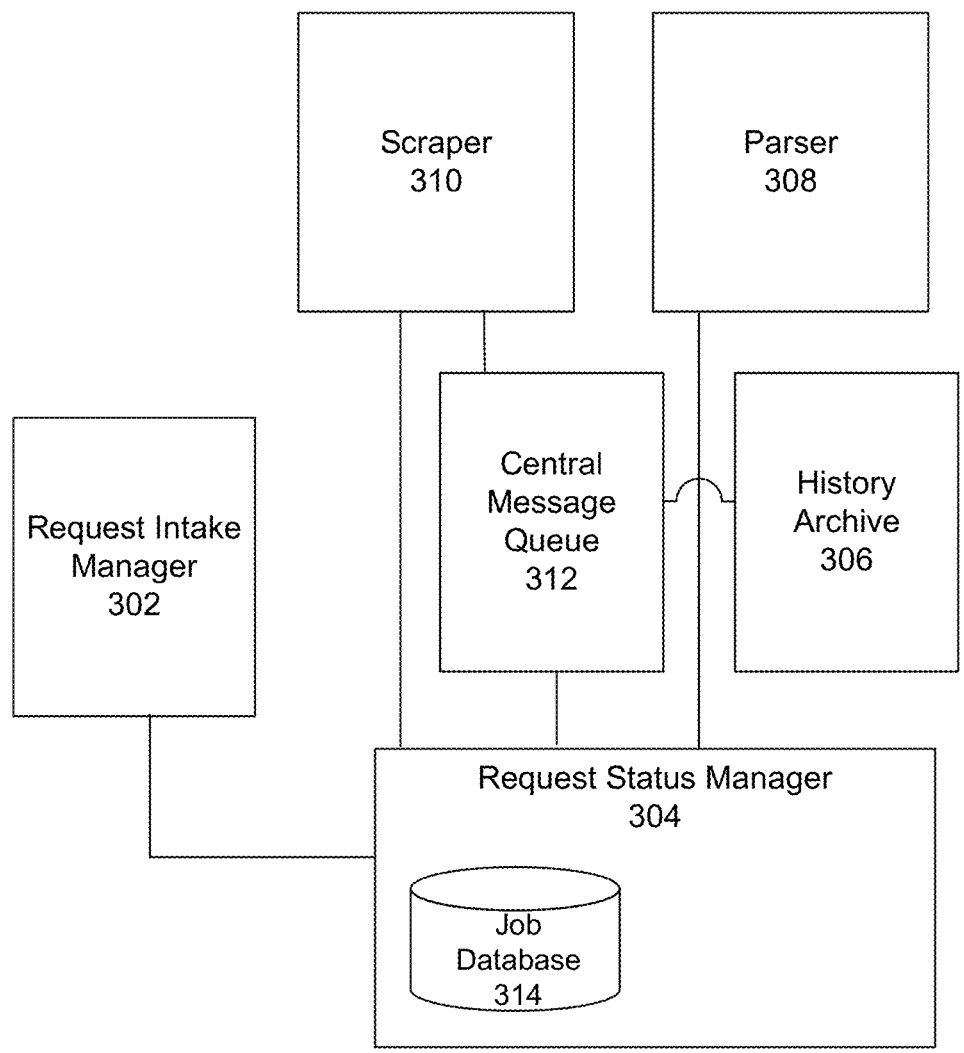
FIG. 3 is an architecture diagram illustrating aspects of a web scraping system in greater detail.

FIG. 3 is an architecture diagram illustrating aspects of web scraping system 104 in greater detail. Web scraping system 104 includes a request intake manager 302, request status manager 304, history archive 306, parser 308, scraper 310, and message queue manager 312. Each of these components is described in turn.

Request intake manager 302 receives and processes incoming requests from client computing device 102. As described above, client computing device 102 can provide requests to request intake manager 302 synchronously and asynchronously. Client computing device 102 can provide the requests using a specialized API or using a proxy protocol.

The API call may include any of the following values as parameters:
 Data source specifying the target website to retrieve, such as a particular search engine or e-commerce website;
 Domain localization specifying the domain name system localization, which may specify the top level domain name of the website to request (".com," ".fr", ".de", etc.);

a keyword to search on the search engine or e-commerce site;

a number indicating how many results to retrieve from the target website;

for scraped results spanning multiple pages, a starting page number and number of pages to retrieve, which together specify the page ranges to scrape;

Accept-Language HTTP header value to use, this header value may signal to the target website the language to return results in;

a geographical location to mimic when making the request;

a device type and browser to mimic when making the request;

a flag to signal whether web scraper system 104 should parse the HTTP response; and a flag to signal whether web scraper system 104 should signal to the target website to AutoCorrect spelling;

a flag to signal whether web scraper system 104 should signal in its cookies to use a particular results language;

any other parameters that might be expected by a target website, such as sorting and filtering methods to be used in conducting the search; and user credentials, such as username/password or a token.

In addition to the above parameters, when the API request is a callback request, the API request provided to request intake manager 302 may include a network location (such as a URL) for web scraping system 104 to provide the callback message when the scraping request has been completed and results are available.

Request intake manager 302 may be configured to take parameters in multiple different formats and may be configured to accept requests using multiple different parameter names. In that embodiment, request intake manager 302 may normalize the different formats and parameter names into a common format before further processing. When request intake manager 302 accepts such a different format from a client computing device, it may remember that the client computing device used that different format and translate any results returned into a format expected by the client computing device.

When request intake manager 302 receives an API request, request intake manager 302 may first validate the request to ensure that the API request conforms to a format that is understood by web scraping system 104 and that the parameters for the API request specify web scraping can be executed by web scraping system 104. When request intake manager 302 confirms that an API request is valid, request intake manager 302 may send the API request to request status manager 304 to manage processing of the request.

For an asynchronous API request, request status manager 304 may return to request intake manager 302 a job identifier that client computing device 102 may later use to retrieve the results of the request. Request intake manager 302 may then send that job identifier to the client computing device 102 for storage and later use when the request is completed.

For a synchronous API request, request status manager 304 may hold the connection with client computing device 102 open until web scraping system 104 completes the scraping requests and results are available. When results are available, request status manager 304 will respond to the API request with the scraped results, closing the connection.

Once request intake manager 302 sends the API request to request status manager 304, request status manager 304 manages processing of the request. Request status manager 304 may save the job description and any return results corresponding to the job description in job database 314. As will be discussed below with respect to FIG. 4, request status manager 304 may include a plurality of servers that operate independently of one another. In particular, the plurality of servers may not know about each other and may not communicate any state to one another.

As will be described in detail below with respect to FIG. 4, request status manager 304 and request intake manager 302 work together to save a description of the job to be processed and an indication of the job status in job database 314.

Once the job description and job status are saved in job database 314, request status manager 304 sends the job description to central message queue 312. Central message queue 312 may be a message broker software application. A message broker software application is an intermediary computer program module that translates a message from a formal messaging protocol of the sender to a formal messaging protocol of the receiver. In different examples, the messaging protocols can include the Advanced Message Queuing Protocol (AMQP), Streaming Text Oriented Messaging Protocol (STOMP), and MQ Telemetry Transport (MQTT). Central message queue 312 provides communication among components of web scraping system 104, including request status manager 304, history archive 306, parser 308, and scraper 310. By mediating communication among the various components, central message queue 312 minimizes the mutual awareness that the various components need one another. This encourages decoupling of the components.

Central message queue 312 may include a first-in-first-out queue for job descriptions. Scraper 310 may monitor central message queue 312, taking jobs off the central message queue 312 and conducting the scraping from target website 108 accordingly. As mentioned above, some jobs may represent a synchronous API request while others may be asynchronous. Scraper 310 may prioritize the synchronous jobs above the asynchronous jobs to help ensure that results are determined before web scraping system 104's connection with the client computing device 102 times out.

As described above, based on the job description retrieved from central message queue 312, scraper 310 may formulate a series of HTTP requests from target website 108 to ultimately retrieve results as specified in the request, such as a desired HTML page.

Once scraper 310 has retrieved the results, scraper 310 may place the retrieved HTML along with an identification of the job on to central message queue 312. Request status manager 304 may retrieve the results from central message queue 312 and placement job database 314. Alternatively or additionally, scraper 310 may send the results directly back to request status manager 304, which places the results in job database 314 and sends a link to the results as will be described below with respect to FIG. 4.

If the API request was strictly requesting HTML, request intake manager 302 may then return the scraped HTML to the user. As described above, if the request from client computing device 102 is synchronous, request intake manager 302 may send the scraped HTML to client computing device 102 in response to the request. Alternatively, if the request is asynchronous, request intake manager 302 may send a notification to client computing device 102 that the results are available and client computing device 102 may retrieve the scraped HTML from job database 314 via request intake manager 302.

As mentioned above, alternatively or additionally to the HTML results, client computing device 102 may request parsed results. Parsing of the scraped HTML may be executed by parser 308. Parser 308 may analyze the scraped HTML file and may extract relevant fields from the HTML file. To analyze the HTML file, parser 308 may use a known format or patterns within the HTML file (such as the Document Object Model) to identify where the relevant fields are located. With the relevant fields extracted, parser 308 may insert the extracted fields into a new data structure, such as a file. In an example, the new file may be a JavaScript Object Notation (JSON) format, which is a standard data interchange format. The resulting file with the parsed data may be stored in job database 314 and returned to client computing device 102.

Retrieved results may also be stored to history archive 306. History archive 306 is an archival, or cold database service. History archive 306 stores the scraped data for longer than job database 314. It is not meant to represent current content from a target website, instead representing historical content. While job database 314 may erase results after a certain time period, such as 24 hours, history archive 306 may store results indefinitely. In one embodiment, history archive 306 may store parsed scraped data but not HTML, data because HTML, data has structure and formatting that may not be relevant to a client. When the parsed data is stored, the job description may be also stored and used as metadata in an index to allow the parsed data to be searched. In the event that a client makes an identical request twice, the results may only be stored in history archive 306 if the results from the first request are older than a certain age, such as one month.

Figure 4:
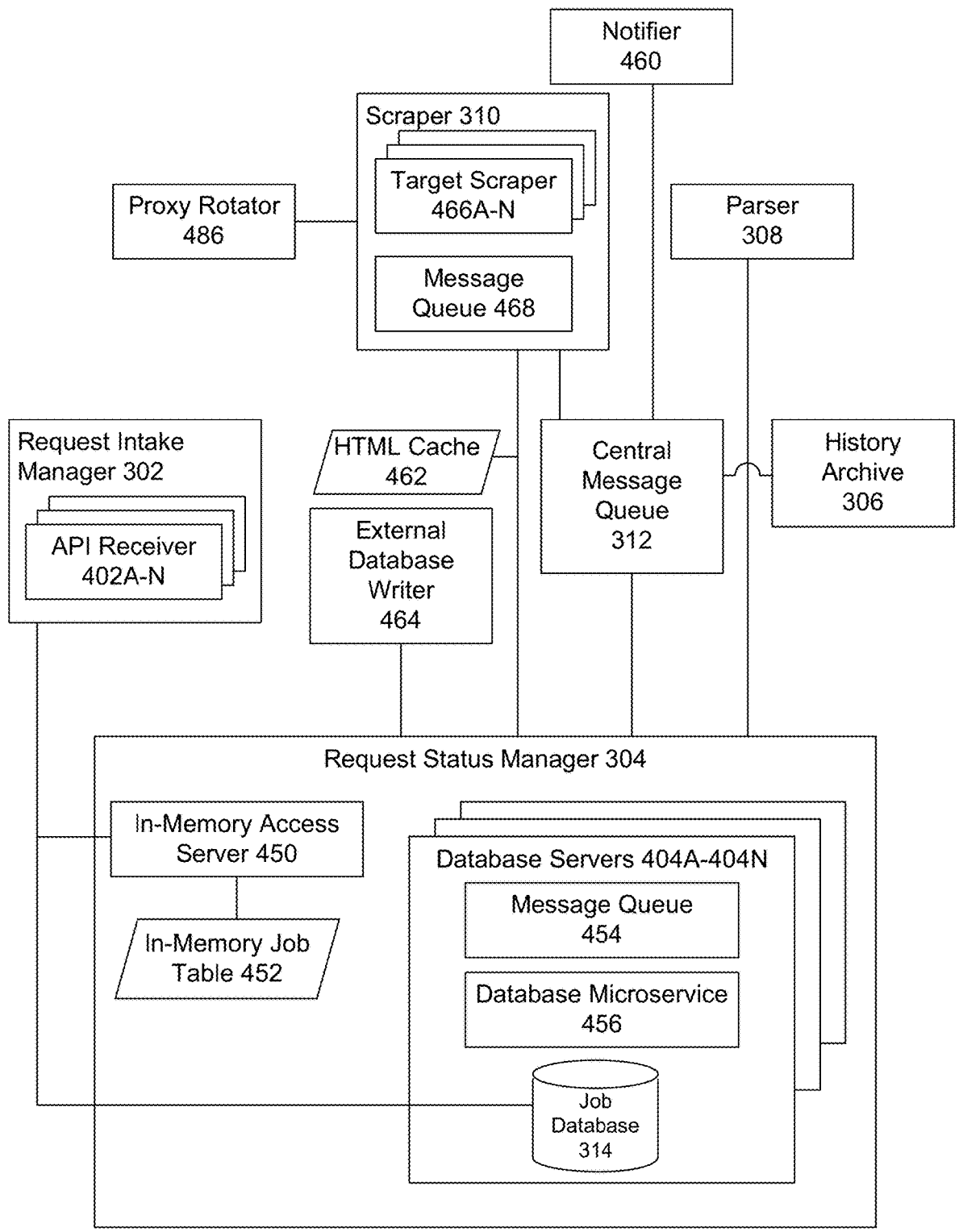
FIG. 4 is an architecture diagram showing components of a web scraping system in greater detail.

FIG. 4 is an architecture diagram showing components of web scraping system 104 in greater detail.

As mentioned above, request status manager 304 includes a plurality of database servers 404A . . . N that operate independently of each other. In particular, the plurality of servers may not know about each other and may not communicate any state to one another.

In an embodiment, each of the plurality of servers 404A-N may be referred to as a database shard. A database shard, or simply a shard, is a horizontal partition of data in a database or search engine. Each shard is held on a separate database server instance, to spread load. Some data within a database may remain present in all shards, but some appears only in a single shard. Each shard acts as the single source for this subset of data. Horizontal partitioning is a database design principle whereby rows of a database table are held separately, rather than being split into columns (which is what normalization and vertical partitioning do, to differing extents). Each partition forms part of a shard, which may in turn be located on a separate database server or physical location.

Horizontal partitioning may be advantageous because tables are divided and distributed across multiple servers. Since the tables are divided and distributed into multiple servers, the total number of rows in each table in each database is reduced. This reduces index size, which may improve search or query performance of the database. Also, a database shard can be placed on separate hardware, and multiple shards can be placed on multiple machines. This enables a distribution of the database over a large number of machines, improving performance.

In another embodiment, instead of independent database servers, database clustering may be used to spread functionality across multiple servers or machines. With database clustering, the various servers must be aware of each other. With database clustering, the database may not be horizontally partitioned across the multiple servers. However, with clustering, the state may need to be synchronized between the various servers. For example, two servers may not be able to update the same row at the same time. While this may have advantages in avoiding the need to partition rows of the database, synchronizing state and avoiding collisions, it may slow performance.

Because the plurality of servers operate independently of one another, request intake manager 302 may need to decide which of the plurality of servers to use and remember which server is processing each job to ensure that information relating to the job, such as scraped results, is sent to the proper server. That is, the database instance that is responsible for managing the API request. Moreover, to realize performance advantages, request status manager 304 may be able to determine how the data is segmented across the multiple shards, thus avoiding the need to query every shard to determine a jobs status or retrieve job information, such as scraped results.

In one embodiment, a job identifier encodes an identification of the shard that is servicing a web scraping request. The job identifier is sent to a client computing device when the request is created. And, when the client computing device seeks to retrieve status information or results for a previous request, the client computing device may use the job identifier it received for that previous request. Request status manager 304 may be able to decode the job identifier to determine which shard is handling the request.

In-memory job table 452 may be used to store and retrieve status information. The in-memory job table 452 may be stored in a volatile (but also non-transitory) memory. Because the memory is volatile, data may be lost if power is disconnected. But volatile memory may, in general, have faster retrieval times than persistent memory. By storing the mapping table in memory, embodiments may provide faster access times. To store job information, each scraping job needs a unique job identification number. In particular, the job identification number needs to be unique across all the database shards.

To access in-memory job table 452 (both reading and writing), request intake manager 302 may send a request to in-memory access server 450. In-memory access server 450 may act as a database server that controls and allows access (and perhaps performs other memory management functions) for in-memory job table 452.

Similar to how request status manager 304 includes multiple servers operating independently of one another, request intake manager 302 may also include multiple servers operating independently of one another. In FIG. 4, these multiple servers are illustrated as API receivers 402A . . . N. Each of API receivers 402A . . . N may perform the functions described above for request intake manager 302, including receiving an API request from client computing device 102, validating the API request, sending information describing the scraping job to request status manager 304, and (for a call back request) returning to client computing device 102 data necessary to retrieve the scraped results when they are available.

Having multiple API receivers 402A . . . N allows the receivers to spread service API requests in parallel and spread computing load across multiple computing resources and machines. Yet, having multiple API receivers 402A . . . N operating independently without sharing state or being aware that other API receivers exist may add complexity in coordinating functionality.

For example, because both the request intake manager 302 and request status manager 304 include multiple servers operating independently of one another, they may not be aware of job identification numbers that have already been assigned. This can lead to difficulties in determining a unique job identification number associated with a new scraping job.

To determine a job identification number, an API receiver 402A . . . N may first determine to which of the plurality of database servers 404A . . . N to send the scraping job. That determination is described in greater detail with respect to FIGS. 10-11. API receivers 402A . . . N may then retrieve a next value from a counter maintained by each respective database servers 404A . . . N. The counter may reset at every time interval, such as every millisecond. API receiver 402A . . . N may concatenate an identification of database servers 404A . . . N with a timestamp and the next value retrieved from in-memory access server 450. In this way, API receiver 402A . . . N may generate a unique job identifier.

In addition to generating the unique job identifier, on receipt of an API request from client computing device 102, API receivers 402A . . . N may validate all the parameters received from client computing device 102, convert them into a format for internal processing by request status manager 304, and send the converted and validated parameters along with the unique job identifier (together referred to as a job description) to the selected database server 404A . . . N.

In particular, the API receivers 402A . . . N may send the job description to a message queue 454 implemented within the selected database server 404A . . . N. Once the job description is placed into the appropriate message queue 454, the API receiver may (in the case of an asynchronous request) return the job description to client computing device 102 along with other links on how to retrieve status and how to retrieve results. At that point, for an asynchronous request, API receivers 402A . . . N will close the connection with client computing device 102. For a synchronous request, the connection with computing device 102 will stay open until results are available.

Message queue 454 may be a first-in-first-out queue. It may be implemented as a message broker as described above with respect to central message queue 312. Database micro service 456 may be monitoring message queue 454. Database micro service 456 may periodically or intermittently retrieve a next queued job description from message queue 454 and place the job description and an indication of the job's status (such as "pending") in job database 458. In addition, either by database micro service 456 or another component, the job description and status may be cached at in-memory job table 452.

According to an embodiment, a client computing device 102 may want to inquire of system 104 a job's status. In some applications, client computing device 102 may frequently send system 104 new scraping jobs and frequently ask system 104 of the status of previously sent scraping jobs while they are still in progress. The status requests can quickly add up.

To deal with such requests, when a client tries to retrieve status of a job, the request from client computing device 102 may be sent to in-memory access server 450 (via request intake manager 302), which retrieves the status information from in-memory job table 452. By caching the status information in job table 452 and using the cached information to service client requests for status, embodiments may relieve job database 314 from performing that task, improving overall performance. Also, the status information may be retrieved more quickly from in-memory job table 452 than from job database 314, improving latency and processing the client request for a scraping job's current status.

Once the job description and job status are saved in job database 314, request status manager 304 sends the job description to central message queue 312. In particular, database micro service 456 places the job description again on message queue 454 implemented in the previously selected database server 404A-N. From message queue 454, the job description is forwarded to central message queue 312.

As described above, scraper 310 retrieves and executes the job from central message queue 312. Scraper 310 retrieves the results and enters them into a message queue 468 that is local to scraper 310. Scraper 310 includes a plurality of target scrapers 466A . . . N. Each of the target scrapers 466A . . . N is configured to scrape a particular target website. For example, target scraper 466A may include instructions to generate a series of HTTP requests to scrape search results from a particular search engine; target scraper 466B may include instructions to generate a series of HTTP requests to scrape search results from a particular e-commerce site; etc. One or more of the target scrapers 466A . . . N may be generic, meaning that they are configured to scrape any website, but are not particularly adapted to the sessions expected of a particular site. Based on the job description (and the customer API request upon which it is based), one of the target scrapers 466A . . . N is selected to generate and transmit the HTTP requests to a proxy server 106.

As discussed above, to generate the HTTP requests so that they appear organic (that is, appear to be generated from a user's browser and not from a bot), various determinations must be made. First, the proxy to be used must be selected. This selection may be done by proxy rotator 486. The selected target scraper 466A . . . N may request an appropriate proxy from proxy rotator 486. Second, the selected target scraper 466A . . . N must determine the appropriate headers to use in the HTTP request, including any cookies needed. Third, selected target scraper 466A . . . N must generate the path for the HTTP request itself.

Proxy rotator 486 determines the appropriate proxy to which to send the request. Proxy rotator 486 may track which proxies are available to use and which have been blocked. For example, proxy rotator 486 may track what responses a target website has previously returned to the proxy in response to previous requests from scraper 310. To track this information, scraper 310 may report to rotator 486 the status of the request through the proxy, as rotator 486 may not monitor the connections between the proxies and scrapers. If a response was an error or timeout, proxy rotator 486 may identify that proxy is blocked by that target website. Moreover, proxy rotator 486 may track which proxies have been used recently or heavily. When a proxy has been used recently or heavily, proxy rotator 486 may select a different proxy to allow the recently or heavily used proxy to cool down, extending its life before a target website might block it.

As mentioned above for FIG. 2, the selected target scraper 466A . . . N may determine many of the headers based on the user parameters from the API, which are saved in the job description that the selected target scraper 466A . . . N receives from central message queue 312. These headers include the user agent to specify the request, such as a particular desktop or mobile browser. If the API request does not specify a particular user agent, the selected target scraper 466A . . . N may select a user agent to specify from a predetermined list. As discussed above with respect to FIG. 2, cookies may require that the selected target scraper 466A . . . N make multiple successive requests to a target website to get the needed session information.

Finally, the selected target scraper 466A . . . N may determine a path of the HTTP request. Depending on how the client provided its scraping API request, the client may have specified the full URL to scrape or the client may have merely provided parameters for scraping. If the client provided the full URL, the full URL path may be used. Alternatively, if the client merely provided parameters, the parameters may be incorporated into a path in the format expected by a target website. As mentioned above, a client can specify a geolocation to spoof in the request. The geolocation may specify certain parameters that the selected target scraper 466A . . . N includes in the path. Even if the client specifies the full URL, the selected target scraper 466A . . . N may need to modify the URL or URI to impersonate that location.

With the HTTP request(s) generated, the selected target scraper 466A . . . N sends the request to a proxy and retrieves the results from the target website via the proxy as discussed above with respect to FIG. 2. The resulting page typically includes HTML. The HTML may include links to other objects, such as images and widgets to display and interact with things like geographic maps (perhaps retrieved from a third party web service). In addition, the HTML may include a JavaScript that has some functionality requiring execution to render. In some cases, a client may be interested in aspects of the page not represented in the HTML. In this case, the selected target scraper 466A . . . N may interact with a headless web browser (not shown) that has the necessary functionality to execute the JavaScript and retrieve any objects linked within the HTML. In this way, the headless web browser can develop a full rendering of the scraped webpage, or at least retrieve the information that would be needed to develop the full rendering.

When the selected target scraper 466A . . . N sends the request to a proxy, an error could occur making the scraper unable to retrieve the results. For example, the selected target scraper 466A . . . N may recognize the response received from the proxy as incomplete, blocked with errors (such as an error status code in the HTTP response), or as having other problems. Depending on the type of error, the selected target scraper 466A . . . N may try to retrieve results again. In that case, the selected target scraper 466A . . . N will place the job description as a new message back on central message queue 312. When scraper 310 extracts that message from central message queue 312, scraper 310 will try to generate a new HTTP request. In generating the new HTTP request, proxy rotator 486 will determine a new proxy to which to send the new HTTP request, increasing the likelihood that the target website will service the new request and return the desired results.

When the results are returned, target scraper places the results on message queue 468. From there, the results are forwarded to message queue 454. Database microservice 456 retrieves the results from message queue 454. Then, database microservice 456 stores the results in job database 314.

As mentioned above, the message forwarded from message queue 454 to database microservice 456 may not include the actual HTML scraped. Instead, scraper 466 places the HTML in an HTML cache 462. HTML cache 462 may be a distributed memory-caching system. Instead of storing the HTML in any message queue, the HTML may be stored in HTML cache 462 and the message queued and transmitted to database microservice 456 may be a link to HTML cache 462. When database microservice 456 receives a message indicating that results have been retrieved, database microservice 456 uses the link to retrieve the results from HTML cache 462.

Bypassing message queues in this way may be advantageous because having a large amount of HTML within a message may slow down operation of a message queue, such as message queue 454. This is because performance of message broker software applications tends to be sensitive to the size of the messages being sent.

With the results returned to database microservice 456, the job status entry of job database 314 needs to be updated to reflect the job's "completed" status. The job status entry of in-memory job table 452 may now be out-of-date and, as a consequence, the entry for the job in in-memory job table 452 may be removed, for example, by database microservice 456. With the entry removed, if a client is requesting the job status, the next time a status request is received, the results may be retrieved directly from job database 314.

Additionally or alternatively, database microservice 456 may send a message with a job identifier and with an indication that the corresponding job has been completed to central message queue 312. That message may be picked up by notifier 460 which attempts to contact the client, perhaps at the URL they provided with the initial request, with a callback message indicating that results are available for the scraping request. The callback message may include a URL where the results can be retrieved.

As mentioned above, in addition to HTML, client computing device 102 may request parsed data, which can be generated by parser 308. In that embodiment, before database microservice 456 changes the job status to complete in job database 314 and sends a message to notifier 460 to send the callback message, database microservice 456 will send a message with the HTML via message queue 454 to parser 308. In an alternative embodiment, instead of sending the message with the HTML via message queue 454 to parser 308, the message will be sent with a link to the HTML file in HTML cache 462. When the message is received at parser 308, parser 308 can retrieve the HTML file from HTML cache 462 using the link within the message. Avoiding sending a large HTML file via message brokers, including message queue 454, may have speed benefits as described above. Alternatively or additionally, parser 308 can consume a message linking to results in HTML cache 462 directly from central message queue 312, avoiding message queue 454.

Parser 308 conducts the parsing, generates the parsed data file and returns the parsed data file back to database microservice 456, which stores the parsed data file in job database 314. Only then, after the parsed data is stored in job database 314, does database microservice 456 update the job completion status and job database 314 and send a message to notifier 460 to send the callback message.

Also, as mentioned above, client computing device 102 can request that results be written to a particular external database belonging to the client, the external database may be a cloud storage database such as an S3 database available from Amazon.com, Inc. of Seattle Wash. In that embodiment, database microservice 456 may send the results to external database writer 464, which sends the results to the external database that the client had specified. In that case, the callback is sent after database writer 464 completes its job. The completion confirmation is sent via central message queue 312 and forwarded to message queue 454 where it is consumed by database microservice 456 for transmission of the callback message to the client.

Throttling Web Scraping Requests

Figure 5:
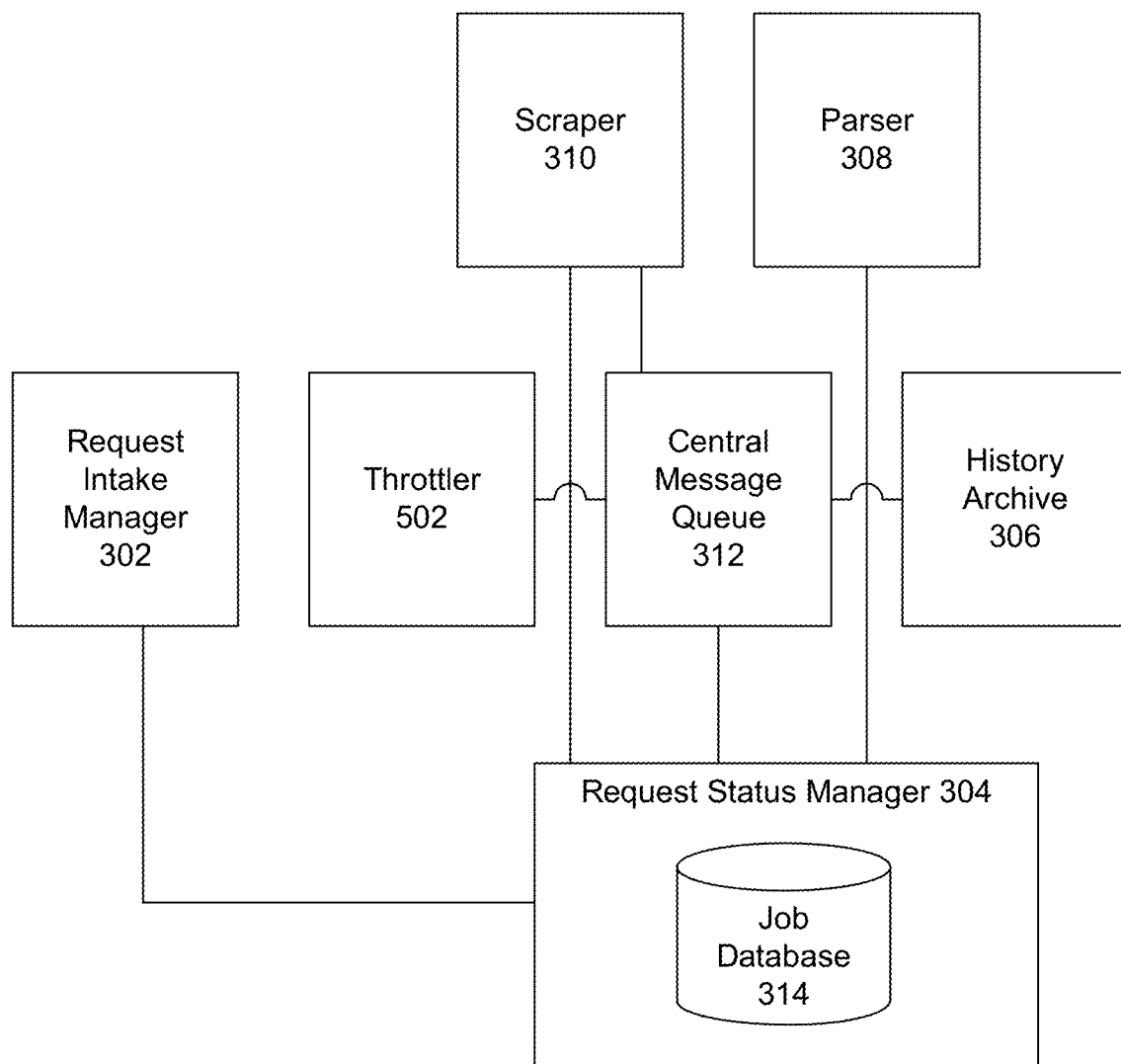
FIG. 5 illustrates a web scraping system with a throttler, according to an embodiment.

FIG. 5 illustrates a web scraping system 104 with a throttler 502. In some cases, client computing device 102 may send a large number of requests for web scraping to web scraping system 104 in a short amount of time. The client may not want to stagger requests or may not know how to stagger requests into web scraping system 104. Instead, the client may prefer to send all the scraping job requests to web scraping system 104 at substantially the same time.

As mentioned above, scraper 310 may have a limited number of resources, including available proxies that can execute the requests. Those proxies become depleted with time or with enough concurrent requests as target websites begin to recognize that the requests originating from a proxy are automated and start to block incoming requests from the proxy. If too many proxies are depleted, scraper 310 may be unable to scrape data, effectively disabling web scraping system 104.

While the client may prefer to send a large number of the scraping job requests to web scraping system 104 within a short time interval, the client may not care whether the results are returned immediately or over the course of an extended time period.

Throttler 502 enables web scraping system 104 to accept a large number of requests, but stagger when they are executed. Operation of throttler 502 is described in greater detail with respect to FIGS. 6 and 7.

Figure 6:
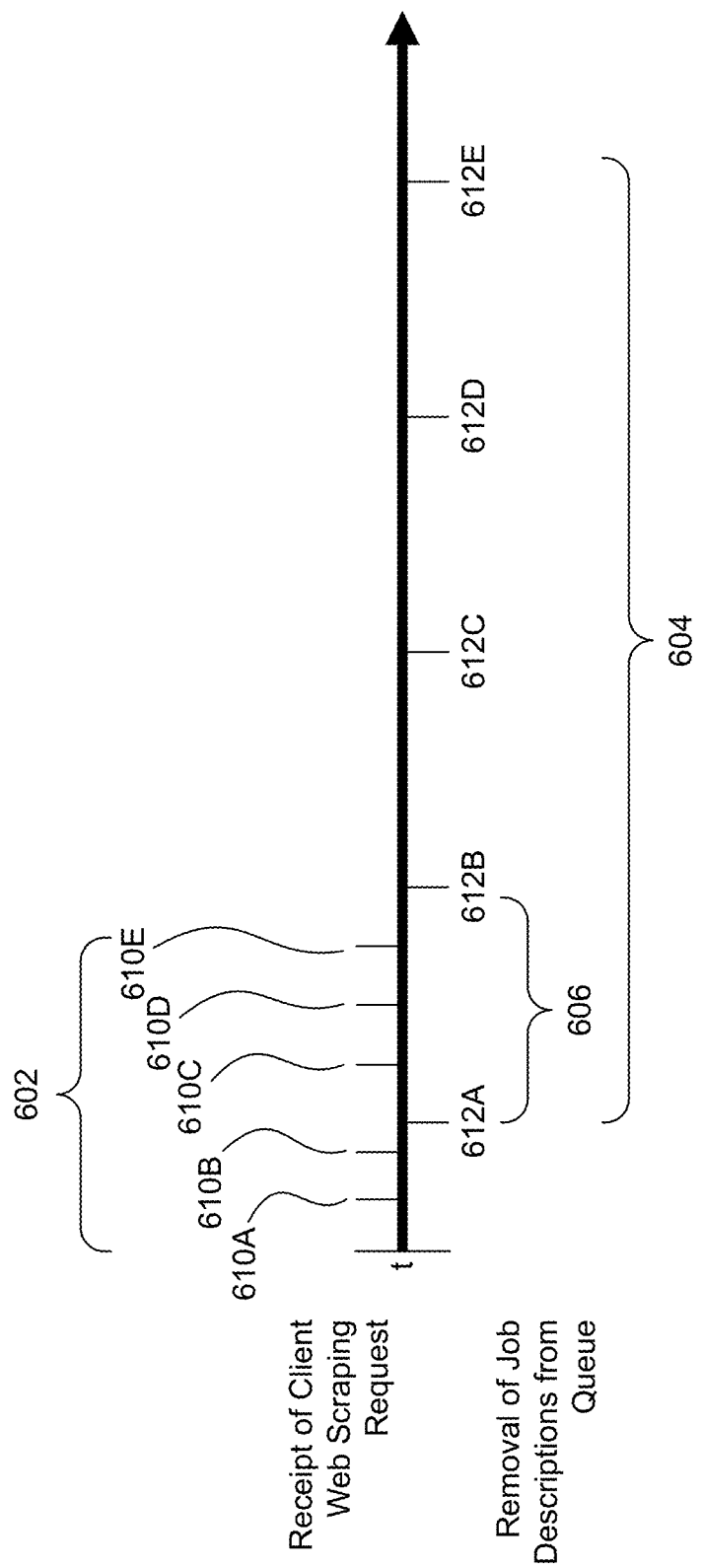
FIG. 6 is a diagram illustrating how web requests can be throttled and trickled out over time.

FIG. 6 shows a timeline 600 illustrating how web requests can be throttled and trickled out over time. Timeline 600 illustrates how a plurality of web scraping requests 610A-E are received during a time period 602. As described above, each of the plurality of web scraping requests specifies a target website from which to capture content. And based on the incoming requests, job descriptions describing the web scraping job described by the request are generated. The descriptions are placed on a queue.

The job descriptions are removed from the queue over a time period 604. Time period 604 is longer than time period 602. The job descriptions may be removed incrementally over a repeating, fixed interval 606. The job description corresponding to API request 610A is removed at time 612A; the job description corresponding to API request 610B is removed at time 612B; the job description corresponding to API request 610C is removed at time 612C; the job description corresponding to API request 610D is removed at time 612D; and the job description corresponding to API request 610E is removed at time 612E. When each respective job description is removed from the queue, a web request for the target website as specified in the job description is generated. The generated web request is transmitted to the target website for processing.

Alternatively or additionally, the interval 606 may be variable. Alternatively or additionally, the requests may be removed non-sequentially (that is, out of order). For example, there can be prioritized queuing. In another example, a scraper can remove a job description lower ranked in the queue while another scraper is still processing a higher ranked job description.

As described above, the generated web request may be transmitted to the target website such that the web request reaches the target website via a proxy selected from a group of proxies. According to an embodiment, the interval 606 may be selected to avoid the group of proxies from becoming blocked by the target website. In response to the web request, the content transmitted from the target website is received via the selected proxy. And the received content is transmitted to the client computing device.

Figure 7:
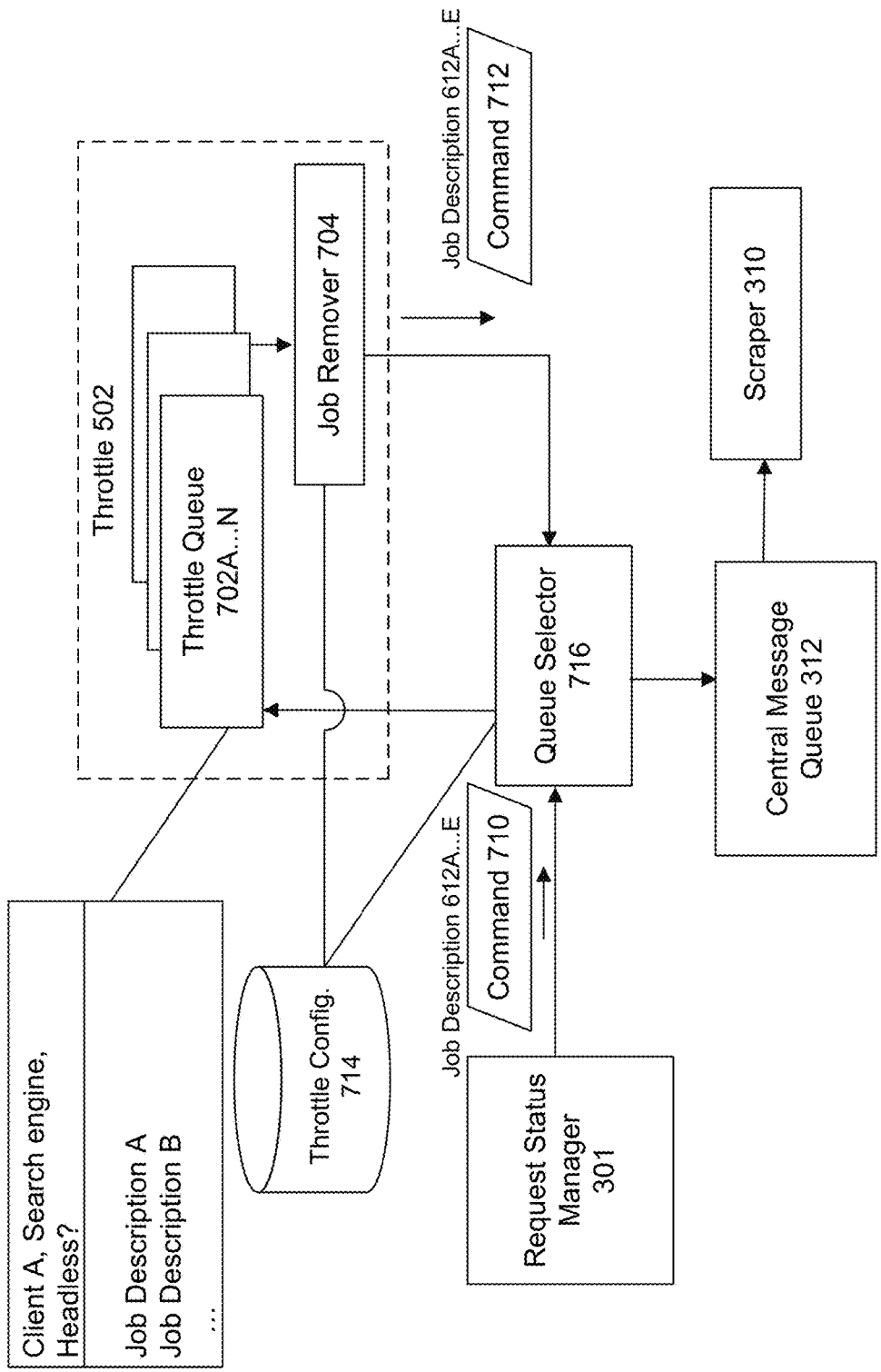
FIG. 7 is a system diagram illustrating how the throttling mechanism can be implemented in a web scraping system.

More details on how the requests can be throttled are illustrated in FIG. 7. FIG. 7 is a system diagram 700 illustrating how the throttling mechanism can be implemented within web scraping system 104.

As described above, a request intake manager 302 is configured to receive a plurality of web scraping requests from a client computing device 102 (not shown in FIG. 7). Those API requests are sent to request status manager 304. Request status manager 304 may evaluate each API request and compare the request to parameters stored in throttle configuration database 714.

Throttle configuration database 714 stores information about which requests should be throttled. This may be set up on a per-client basis based on the level of service to which they have subscribed. For example, a client purchasing a higher level of service may experience less or no throttling, web scraping system 104 accepting that proxies may be depleted more quickly when servicing that customer's requests. Conversely, a client purchasing a lower level of service may opt for more throttling as they may not need results as quickly or may prefer to send a large number of requests within a short time period without requiring them all to be serviced immediately.

The parameters stored in throttle configuration database 714 may include aspects of the API request that are needed to define whether or not the API request should be throttled and how the API request should be throttled. For example, throttle configuration database 714 may have an entry for a particular client, target, and whether or not the API request is requesting that the web request be done from a headless browser.

Request status manager 304 may compare the API request to the parameters stored in throttle configuration database 714 and, based on that, may send the corresponding job description and a command 710 to a queue selector 716. Command 710 may indicate whether or not a web request described by the respective job description should be throttled.

Based on the command 710, queue selector 716 sends the respective job description to either throttler 502 or central message queue 312. When command 710 indicates that the request should not be throttled, queue selector 716 may send the job description to central message queue 312, where it is picked up and processed by scraper 310 as described above.

When command 710 indicates the request should be throttled, queue selector 716 sends the job description to throttler 502. Throttler 502 includes a plurality of throttle queues 702A . . . N. Throttler 502 may select from the plurality of throttle queues 702A . . . N depending on aspects of the job description. In an embodiment, each job description may include a client identifier indicating a client from which the request originates. Queue selector 716 may select the queue for the job description from a plurality of queues 702A . . . N based on the client identifier. Additionally or alternatively, each job description may include an identifier of the target website. Queue selector 716 may select the queue for the job description from a plurality of queues 702A . . . N based on the target website.

Additionally or alternatively, queue selector 716 may select the queue for the job description from a plurality of queues 702A . . . N based on whether the job description specifies that web scraping be made from a headless browser. As described above, when the job description requests that web scraping be made with the headless browser, further requests are made to retrieve content that would be needed to render the target web page. For example, when a web page HTML is received from the target website, the content is analyzed to determine web addresses for additional content needed to render the web page and the additional content from the web addresses.

Jobs are removed from the respective throttle queues 702A . . . N by a job remover 704. Job remover 704 is configured to remove job descriptions incrementally. Each of the throttle queues 702A . . . N may have an associated time window that job remover 704 waits between job descriptions. The associated time window may be stored in throttle configuration database 714 and may correspond to a level of service to which the client has subscribed. In addition, throttle configuration database 714 may have a number of job descriptions that should be removed from the respective throttle queue 702A . . . N during each time increment. For example, according to the specification in throttle configuration database 714, job remover 704 may remove five job descriptions from throttle queue 702A every 20 seconds.

When job remover 704 removes a job description from throttle queues 702A . . . N, job remover 704 provides the job description to queue selector 716 along with a command 712 indicating that throttling is no longer necessary and that the job should be processed. Based on command 712, queue selector 716 forwards the job description to central message queue 312 where it is processed by scraper 310 as described above.

As mentioned above, throttling functionality is specified in throttle configuration database 714 according to a level of service requested by the customer. Based on the level of service, throttling may no longer be needed. When web scraping system 104 determines that web scraping requests from the client computing device no longer need to be throttled, system 104 may first determine when the queue is empty. Only when the queue is determined to be empty does web scraping system 104 delete the queue.

Traffic Counting for Proxy Web Scraping

Traditionally, proxy web scraping services may have tracked user activity on a per request basis for invoicing purposes. According to embodiments, user activity for proxy web based scraping services is tracked on a traffic basis. In particular, when a response is received to a web scraping traffic total, the amount of data transferred over a physical network layer may be calculated. To calculate the amount of data, an adjustment may be made to the total amount of data received to account for compression that occurs when the data is transferred. In addition, the amount of data may exclude requests and responses needed to acquire session information to request the scraped traffic.

Figure 8:
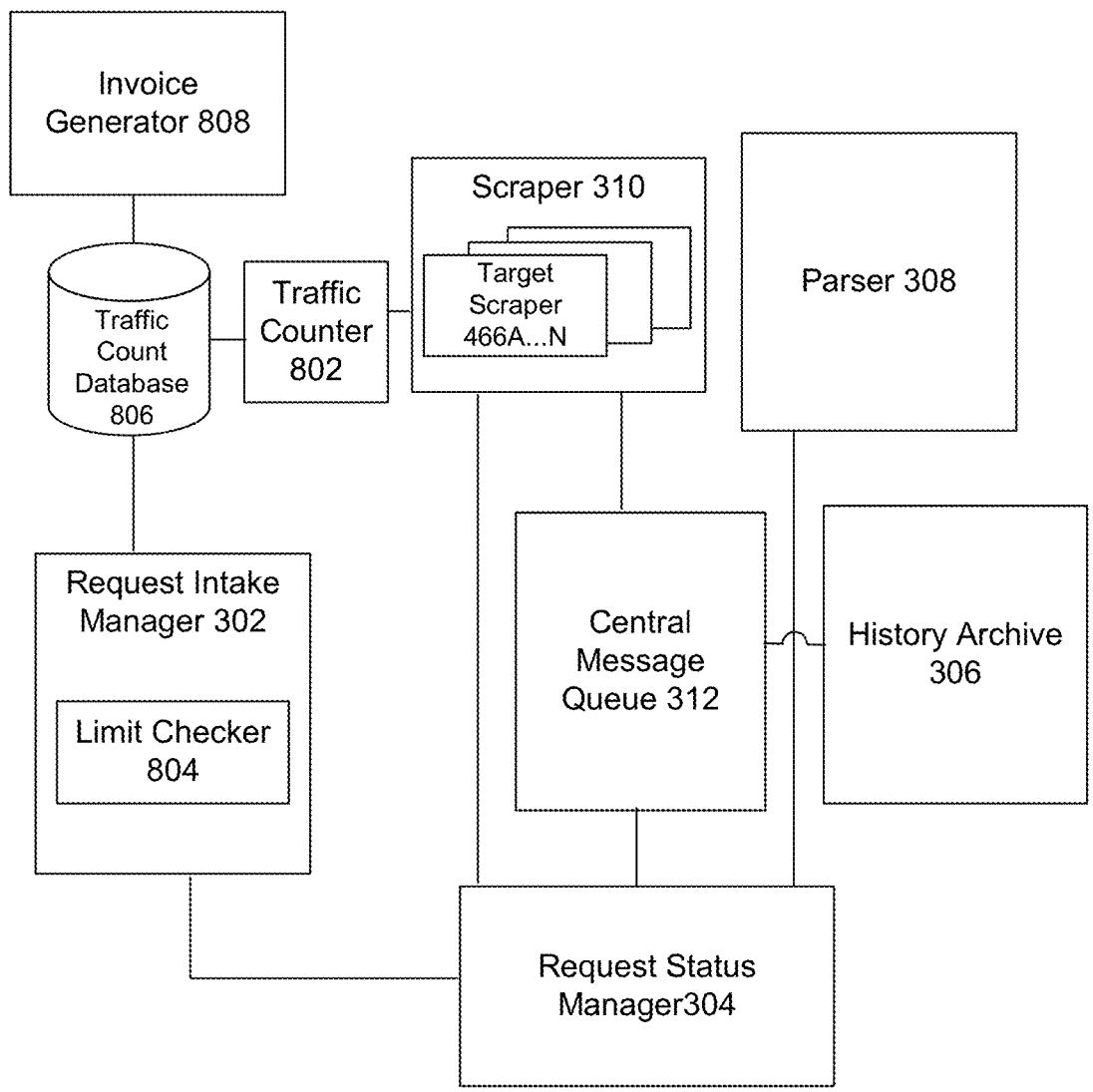
FIG. 8 is a system diagram illustrating how traffic counting can be implemented in a web scraping system.

FIG. 8 is a system diagram illustrating how traffic counting can be implemented in a web scraping system. FIG. 8 illustrates that web scraping system 104 includes a traffic counter 802, traffic count database 806 and invoice generator 808.

Traffic counter 802 is configured to track the amount of traffic received and/or sent by scraper 310 and store the data in traffic count database 806. Traffic counter 802 may count data from content and may count data from requests.

When web scraping system 104 receives new client requests from a client computing device 102, request intake manager 302 has a limit checker 804 that checks whether the current amount of data that a client requests to scrape in a particular time exceeds a maximum threshold, which can be set based on a service level of the client. If it has exceeded a maximum threshold, request intake manager 302 may refuse to service the request.

Invoice generator 808 generates an invoice based on traffic counts in traffic count database 806. In addition, invoice generator 808 can serve as an interface to enable a client to get the amount of remaining data in his periodic (e.g. monthly) usage plan. For example, invoice generator 808 can receive a request from a client, determine an amount of data remaining as a difference between the current traffic total and a maximum allowable for the client, and return the amount of data remaining to the client.

Figure 9:
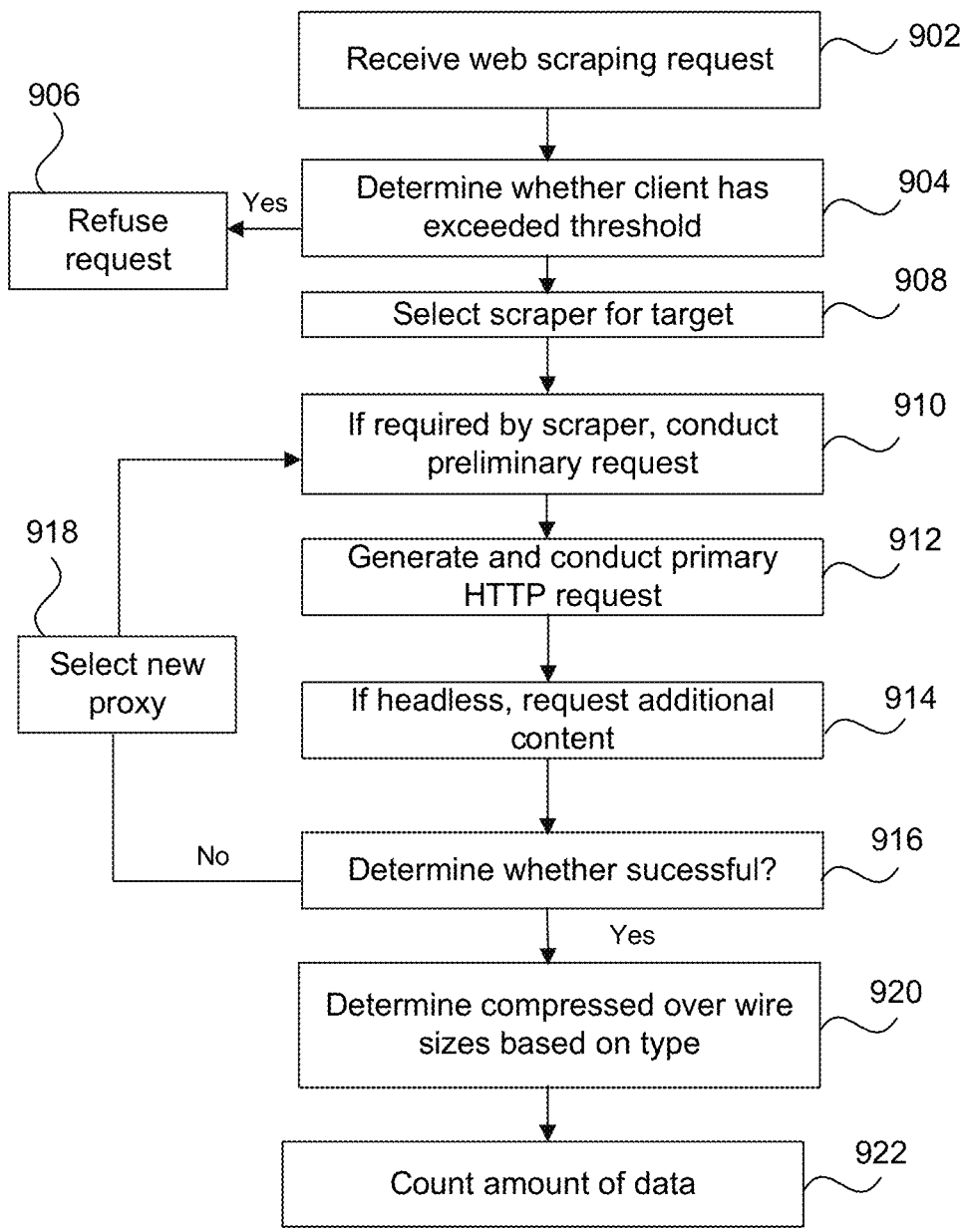
FIG. 9 is a flowchart illustrating a method for counting and regulating traffic in a web scraping system.

FIG. 9 is a flowchart illustrating a method 900 for counting and regulating traffic in a web scraping system 104.

Method 900 begins with receipt of a web scraping request at step 902. As described above this receipt may occur at request intake manager 302 and the web scraping request may be from a client computing device, such as client computing device 102. The web scraping request is formatted according to an API understood by web scraping system 104 and may target a website. The API request may also specify the client making the request.

At step 904, limit checker 804 determines whether a current traffic total representing the amount of traffic tracked for particular client during the time window (such as monthly) exceeds a maximum allowable for the client. For example, limit checker 804 may check traffic count database 806 to determine the maximum allowable for the client. This check may occur in response to a request, repeatedly or intermittently. The maximum allowable may be set based on the level of service to which the client subscribes. Moreover, as will be described below, the maximum allowed may be specific, not just to a client but also to a scraper that the web scraping request received from the client computing device invokes. In that situation, traffic count database 806 tracks not just the current traffic level for the client but also the current traffic level for a particular scraper used by the client. Limit checker 804 determines whether the current traffic level for the scraper used by the client exceeds the maximum threshold.

When traffic count database 806 determines that the current traffic level exceeds a maximum threshold for the time period, the operation proceeds to step 906, where request intake manager 302 refuses to process the request. When traffic count database 806 determines that the current traffic level does not exceed the maximum threshold for the time period, the operation proceeds to step 908.

At step 908, scraper 310 selects a scraper from a plurality of scrapers 466A . . . N based on the target website such that the selected scraper includes instructions on how to generate the web request to extract data from the target website. As described above, each of the plurality of scrapers 466A . . . N include instructions on how to generate one or more HTTP requests from the target websites to be scraped. The instructions specified by the scraper are executed in steps 910 and 912.

At step 910, any preliminary requests specified by the scraper selected in step 908 are conducted. As described above with respect to FIG. 2, to reach the ultimate target website, preliminary requests and responses may need to be conducted to get cookies expected by the target website. These requests are made from a proxy selected from a group of proxies. In different embodiments, these requests and responses may be counted towards the traffic total for a client and scraper. Alternatively, they may be excluded.

At step 912, the HTTP web request is made to capture the target website that the user sought to scrape. The request is generated as specified in the scraper and transmitted to the target website via the proxy. Via the proxy, content is received from the target website. The size of the request and response is counted towards the total for a client of the client computing device, the size of this content is counted toward the traffic total.

At step 914, additional content may be requested if the web API request is for a headless browser. As described above, and in that situation, an additional request may be made to retrieve content that would be needed to render the scraped page. In an embodiment, these additional requests and responses may also be counted toward the traffic total. Alternatively, they may be excluded.

As described above, many websites are trying to block automated requests. At step 916, a determination may be made whether the request made in steps 910-914 was successful. If it was not successful, then the data counts for that request and response may not be excluded from the total. A new proxy is selected at step 918, and the operation passes back to step 910 to repeat steps 910-916 until the request is successfully processed. In this way, when the target website is determined to have refused to serve the web request from the proxy, web scraping system 104 repeatedly attempts to re-send the web request to the target website via a different proxy. When the request is successful at step 916, the operation passes to step 920.

At step 920, the amount of data in the requests and responses in steps 910-916 as compressed for transmission over a network is determined. The determination may be made based on the compression level that would be used to transmit at a lower layer, such as the network, data link, or physical layer of the network.

To conduct that determination, an estimated compression level may be determined. In particular, a type of data represented by the received content may be determined. As described above with respect to FIG. 2, this type of data may be described, for example, in the HTTP headers. Based on the type of data, a compression factor representing an amount of compression expected when the type of data is transmitted over a network is determined. That determination may be made, for example, by looking up in a table a benchmark compression ratio for data of that type. Based on that compression factor, the amount of data in the received content as compressed for transmission is determined.

At step 922, the compressed count is included in a total amount of data for the client/scraper. Then, when new requests come in, the process 900 is repeated. If the total amount of data has exceeded the threshold at 904, the request is refused at 906.

Shards Disabling

As described above, a plurality of database servers 404A . . . N, for example shards, are used to access job database 314. Sometimes, at least one of the plurality of database servers 404A . . . N should be disabled, avoiding further jobs sent to the disabled server. For example, a database server may stop performing at all (for example, the process may be hung up or have crashed), it may stop performing well enough, or it may be overloaded and should not receive any more jobs until it frees up. How database servers 404A . . . N can be disabled is described with respect to FIGS. 10-11.

Figure 10:
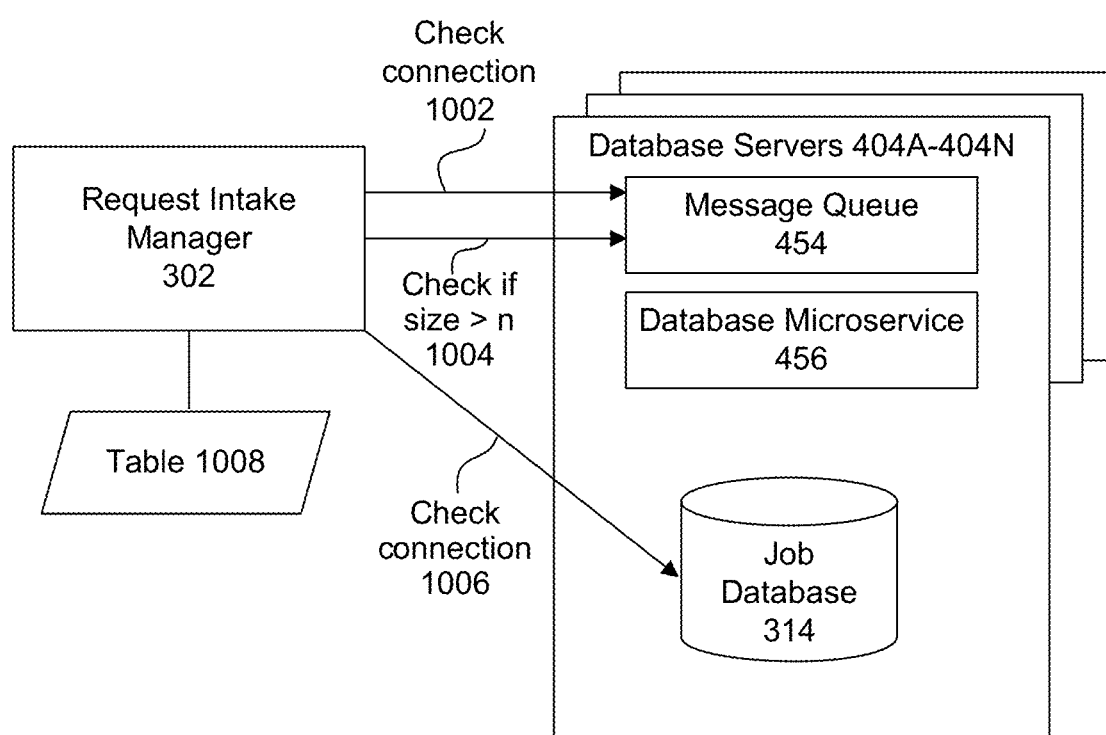
FIG. 10 illustrates operation of various components of a web scraping system to detect whether its various database servers should be enabled or disabled.

FIG. 10 illustrates operation of various components of web scraping system 104 to detect whether respective database servers 404A . . . N should be enabled or disabled.

As described above, each respective database server 404A . . . N has a message queue 454. As described above, message queue 454 is a message broker that queues job descriptions for consumption by database microservice 456. When database microservice 456 consumes a message from message queue 454, database microservice 456 places the job description in job database 314 with a "pending" status, initiating processing of the job.

Request intake manager 302 repeatedly checks the health each of a plurality of database servers 404A . . . N to determine whether they are available to accept new jobs. In various embodiments, the health checks may be periodic or intermittent. Based on the health checks, request intake manager 302 determines whether each of a plurality of database servers are to be enabled or disabled in a table 1008. Table 1008 may be stored in a non-persistent memory to increase access speed.

To check the health of a respective server from the database servers 404A . . . N, request intake manager 302 can repeatedly send various messages to check whether the respective database server is operational in different embodiments. Message 1002 checks the connection between request intake manager 302 (which is a server that receives web scraping requests from client computing devices) and message queue 454 (the respective database server's message broker). If the connection is nonresponsive or returns an error message, request intake manager 302 may mark the respective database server as disabled in table 1008.

Message 1004 checks a number of job descriptions (and possibly other messages used in the scraping process) queued in message queue 454. If the number of job descriptions (and possibly other messages) exceeds a threshold, request intake manager 302 may mark the respective database server as disabled in table 1008.

Message 1006 checks a connection to jobs database 314. Request intake manager 302 may try to connect to jobs database 314. If the connection is nonresponsive or returns an error message, request intake manager 302 may mark the respective database server as disabled in table 1008. If request intake manager 302 can connect to jobs database 314, Request intake manager 302 can infer that database microservice can as well.

In addition to a binary enable or disable status, request intake manager 302 may, depending on the results of messages 1002-1006, mark features of database servers 404A . . . N as enabled or disabled in table 1008. For example, request intake manager 302 may label a database server as read-only, when it is overworked or hung-up, but is capable of providing read access. And, request intake manager 302 may label a database server as shutdown, when even read-only access is not available.

Figure 11:
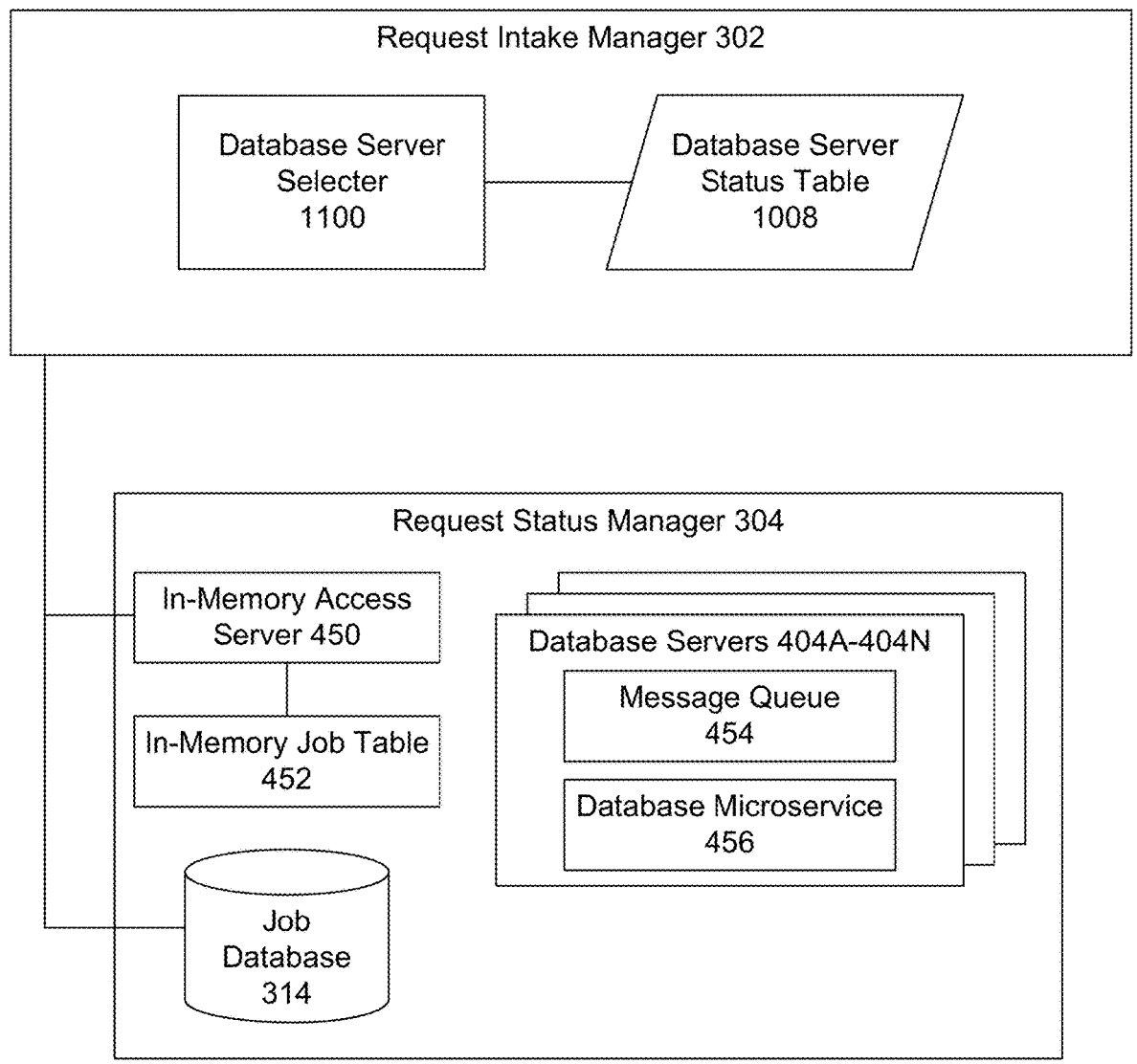
FIG. 11 illustrates various components of a web scraping system to select an enabled database server to process a web scraping request.

FIG. 11 shows how request intake manager 302 uses database server status table 1008 to determine which database servers 404A . . . N to use to service an API request from client computing device 102.

Request intake manager 302 includes a database server selector 1100 that, when a web scraping request is received from a client computing device, selects one of the database servers identified as enabled in the table. After the selection is made, request intake manager 302 sends a job description specified by the web scraping request to the selected database server for storage in the job database as a pending web scraping job.

Request intake manager 302 can also evaluate table 1008 to determine whether a number of database servers that are disabled in the plurality of database servers exceeds a threshold. When the number of database servers that are disabled exceeds the threshold, request intake manager 302 may alert an administrator.

Direct Data Center Request Relating to a Web Scraping Job

Web scraping system 104 may be distributed over a large number of computing devices. The computing devices may be geographically disparate. As described above, the job database 314 may be horizontally partitioned over a large number of database shards. At least in part for this reason, data, such as web scraping results and possibly job status information, may be available at one computing device within web scraping system 104 at one geographic location, but not another. To improve efficiency, it is advantageous to ensure that a request for the results is directed to the correct computing device at the correct geographic location.

Figure 12A:
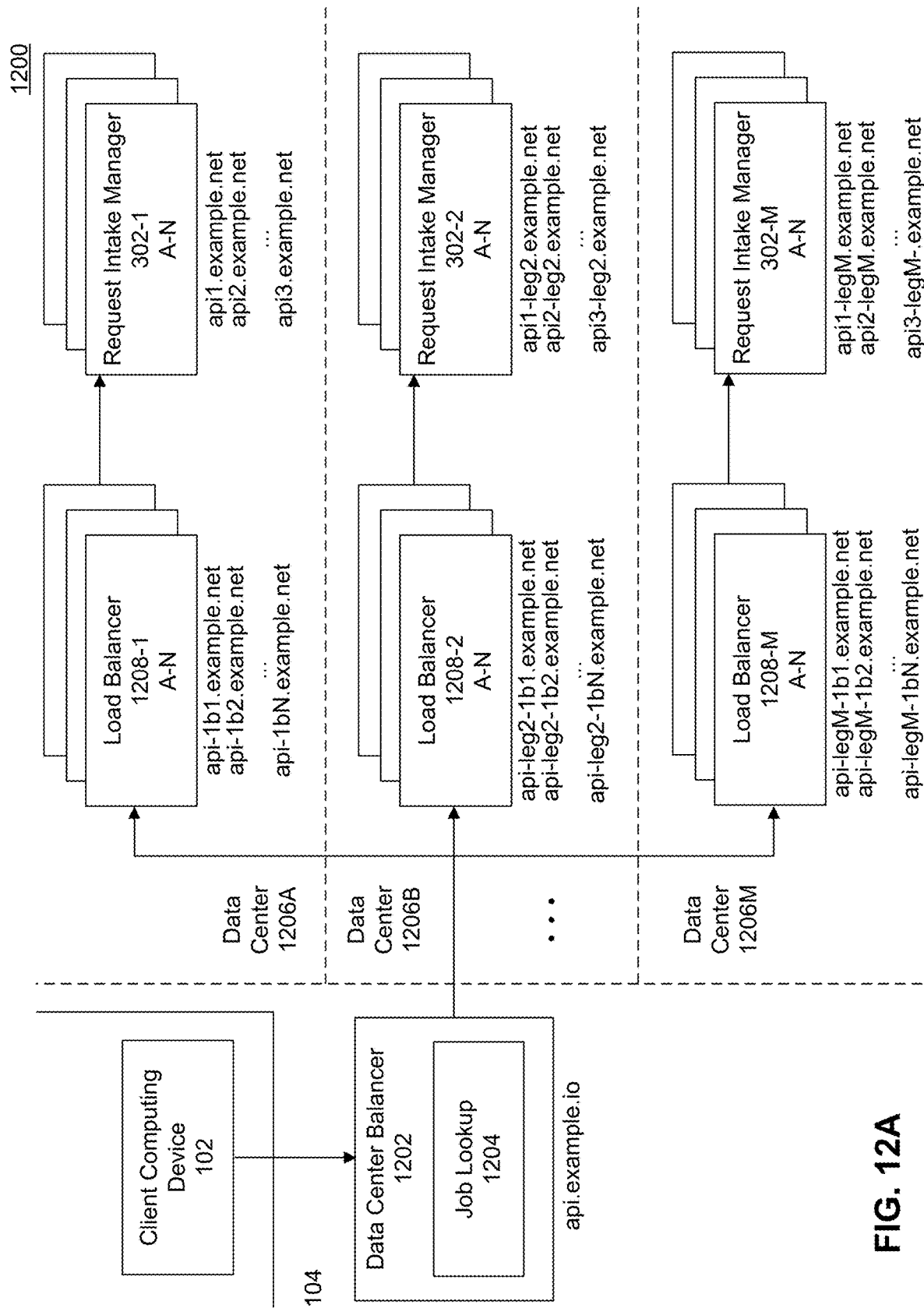
FIGS. 12A-B illustrate systems for load balancing web scraping requests that direct a request for results to the same subdomain that requested content from a target.
Figure 12B:
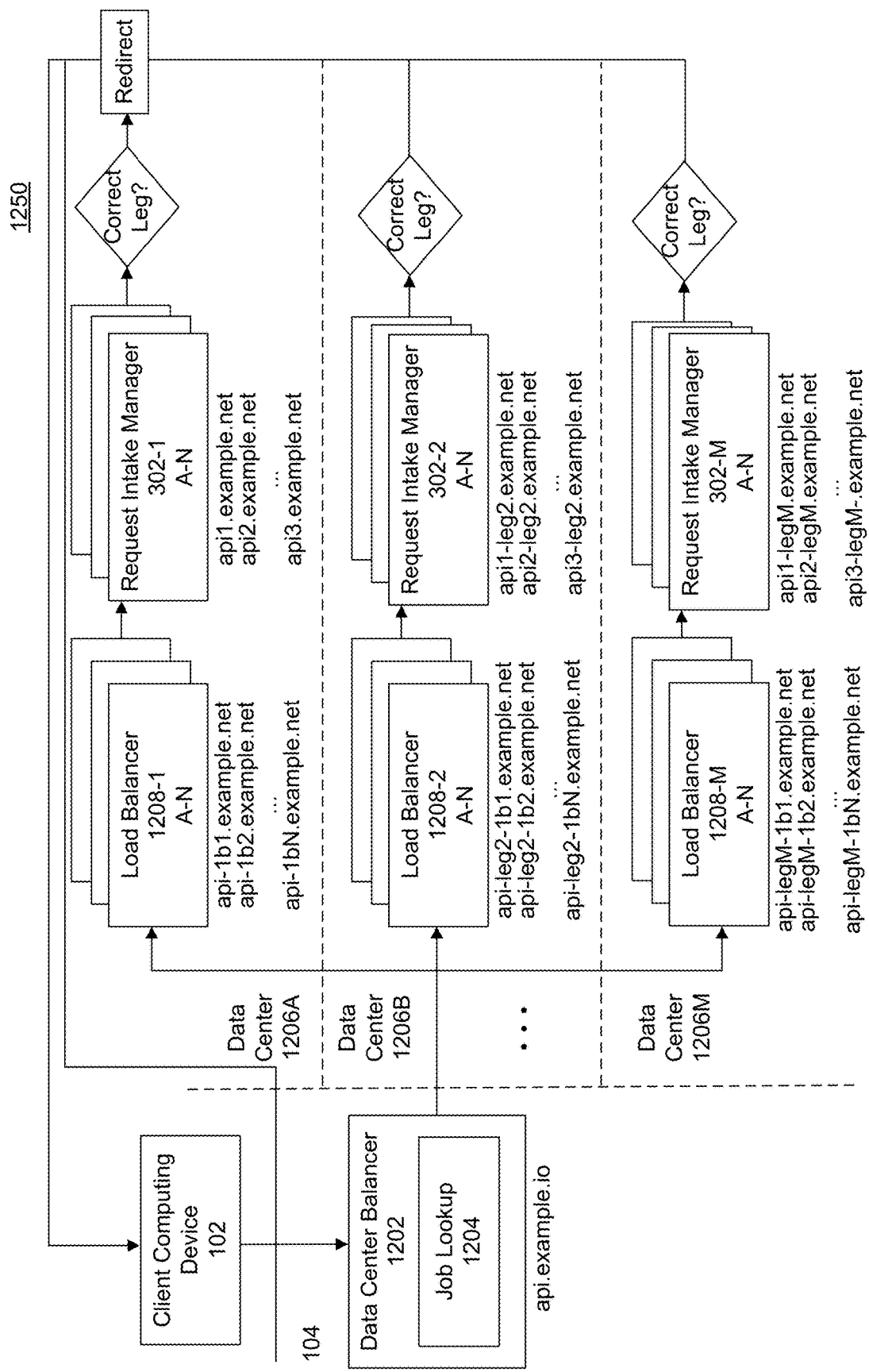

FIGS. 12A-B illustrate systems for load balancing web scraping requests that direct a request for results to the same subdomain that requested results from a target. FIG. 12A shows a system 1200 with tiered load balancers across different locations.

As illustrated in FIG. 12A, system 1200 which includes a data center balancer 1202 that can distribute API requests from client computing device 102 to one of several data centers 1206A . . . N. In one example, data center balancer 1202 may operate by sending back to client computing device 102 an HTTP redirect to one of several destinations each addressable by a hostname. In another example, data center balancer 1202 may act as a proxy, forwarding requests from client computing device 102 to a respective data center.

As illustrated in FIG. 12A, the possible destinations are located at different data centers 1206A . . . N. Each of the data centers 1206A . . . N is a building, a dedicated space within a building, or a group of buildings used to house computer systems and associated components, such as telecommunications and storage systems. Each may include redundant or backup components and infrastructure for power supply, data communication connections, environmental controls (e.g., air conditioning, fire suppression), and various security devices.

In system 1200, different data centers 1206A . . . N include one or more load balancers and one or more instances of request intake manager 302, which, as described above, is a software server that accepts incoming API requests from client computing device 102. In the example in FIG. 12, data center 1206A includes load balancer 1208-1A . . . N and request intake manager 302-1A . . . N; data center 1206B includes load balancer 1208-2A . . . N and request intake manager 302-2A . . . N; and data center 1206N includes load balancer 1208-M, A . . . N and request intake manager 302-M, A . . . N.

Each of the load balancers and request intake managers are addressable by a hostname. A hostname is a label that is assigned to a device connected to a computer network and that is used to identify the device in various forms of electronic communication. Internet hostnames, like those shown in FIG. 12A, are composed of a sequence of labels concatenated with dots. The hostname is resolvable into an Internet protocol (IP) address (that is, an OSI layer 3 network address) using the domain name system. The domain name system is a hierarchical naming space, where the rightmost label conveys the top-level domain and the hierarchy descends right to left, each label to the left specifying a subdomain of the domain to the right. In an embodiment, it is not necessary to differentiate between intake managers in the same DC, so they need not have direct hostnames.

In the example in FIG. 12, the host names of all the host load balancers and request intake manager's have the top level domain "net." All are within a subdomain "example-.net" of "net." Each has a unique subdomain within "example.net" representing the particular network address for the load balancer or request intake manager service. The unique subdomains might follow a regular naming pattern.

For the respective data centers 1206A-N, load balancers 1208-1A . . . N, load balancers 1208-2A . . . N, and load balancers 1208-M, A . . . N determine how to distribute requests among the various request intake managers 302-1A . . . N, request intake managers 302-2A . . . N, and request intake managers 302-M, A . . . N in the corresponding data centers 1206A-N. The group of request intake managers and load balancers within each data center request intake managers and load balancers which may be referred to as a "leg."

Each load balancer may work as a proxy distributing requests among corresponding request intake managers in a particular fashion, such as round-robin. They may, for example, use OSI layer 4 (transport layer) load-balancing forwarding all port 80 TCP requests onto the backend, which may constitute the corresponding group of request intake managers. In this way, the load balancers distribute requests among corresponding request intake managers.

In an example operation, client computing device 102 may make a new API request to web scraping system 104. For usability purposes, data center balancer 1202 may represent the main entry point into web scraping system 104. For example, all new requests may be sent to the hostname "api.example.io," which addresses data center balancer 1202.

With a new web scraping request, which data center, whether 1206A . . . N and request intake manager 302-1-M, A-N or another, ultimately services the request may not matter. Data center balancer 1202 may select which leg and which load balancer within the leg in a random or round-robin fashion. Alternatively, data center balancer 1202 may select a data center 1206A . . . N out of geographical convenience. Data center balancer 1202 redirects the API request for web scraping to one of the load balancers, which selects one of the corresponding request intake managers and accesses the proxy to forward the request on to the corresponding request intake manager. From there, request intake manager 302 validates the request, and causes web scraping system 104 to store a job description in job database 314, initiating the scraping operation, as described above. Once the job is initiated, request intake manager 302 may return, perhaps through load balancer 1208, a job identifier.

As mentioned above, the web scraping request may be asynchronous. In the case of an asynchronous request, client computing device 102 may make a second API request to retrieve the results of the previously requested web scraping job. In addition, as described above, client computing device 102 may make additional API requests to request the status or other information related to the previously requested web scraping job. To identify the relevant job, the API request may include the job description identifier to which it relates.

In that circumstance, at least in one embodiment, client computing device 102 may send the API request to data center balancer 1202. Data center balancer 1202 has a job look up table 1204. Job look up table 1204 may match a job identification number to a corresponding database shard and may match a corresponding database shard to a data center responsible for that shard in that job. Then, data center balancer 1202 may direct the API request to the hostname of a load balancer of a data center with the data needed to respond to the API request.

FIG. 12B illustrates an alternative embodiment. As mentioned above, when request intake manager 302 accepts the initial request, it may return to client computing device 102 a job identifier for the job. In addition, client computing device 102 can return a hostname or complete URL of the request intake manager 302 corresponding to the shard that will receive the results. When the results are available, web scraping system 104 may notify client computing device 102. Alternatively or additionally, that notification message could include the hostname or complete URL of the request intake manager 302 corresponding to the shard that has the results. By supplying the hostname in this manner, client computing device 102 can retrieve the results and request status information directly from the data center that has the data requested.

However, sometimes, client computing device 102 will nonetheless make the request directly to the common entry point offered by data center balancer 1202. In that situation, when the request reaches a data center 1206A-N, software at the data center, such as a load balancer or request intake manager, determines whether the request has reached the correct leg. If it has not, then it identifies the correct leg and identifies a hostname that corresponds to that leg. With the hostname identified, the software returns a redirect command to client computing device 102 to go to the correct leg that has the data the client requested.

To identify the correct leg, each request intake manager 302 (or load balancers 1208) may need to know which data center is responsible for the shard that has the data that the user requested. For example, the request intake manager 302 (or load balancers 1208) may need to map the job identifier with a shard identifier and match the shard identifier with the hostname of a particular leg, such as is described above with respect to job lookup 1204 in FIG. 12A.

FIGS. 13A-B illustrate methods for operation of the systems in FIGS. 12A-B. FIG. 13A illustrates a method 1300 for processing a new web scraping request and FIG. 13B illustrates a method 1350 for retrieving status or results of a prior web scraping job.

Starting with method 1300, at 1302, a request to scrape content is received at the main entry point, such as data center balancer 1202 described with respect to FIGS. 12A and B. The request may be an asynchronous API request to request that the web scraping system scrape the target website as described above and may specify the target website.

At 1304, the web scraping request is generated and executed. The web request for the target website is generated as specified in the API request. The web request is transmitted such that the web request reaches the target website via a proxy selected from a group of proxies. And, in response to the web request, scraped content is received from the target website via the proxy.

At 1306, web scraping system 104 sends a message to client computing device 102 acknowledging the request. The message may include a job identifier and may specify an address or hostname (such as a sub-domain) for the client computing device 102 to retrieve the scraped content.

Turning to method 1350, at 1352, an API request is received from client computing device 102. The API request relates to a web scraping job that was previously requested of a web scraping system. For example, the API request may request results of the web scraping job or a state of the web scraping job.

At 1354, a hostname addressing a host at a data center of a plurality of data centers executing the web scraping system is identified. The data center identified is the one that is servicing or has serviced the web scraping job.

At 1356, the API request is directed to the identified hostname. Steps 1352-1356 may be executed by data center balancer 1202 as the main entry point for web scraping system 104, as described above with respect to FIG. 12A. Alternatively or additionally, steps 1352-1356 may be executed by request intake manager 302, as described above with respect to FIG. 12B. To direct the API request to the identified hostname, web scraping system 104 may return an instruction to client computing device 102 to redirect to the identified hostname, for example using an HTTP redirect response. Alternatively, the respective request intake manager 302 may act as a proxy to forward the API request to the identified hostname.

Finally, at 1358, the API request is serviced at the identified data center, servicing the API request. In this way, the requested results or status is returned to client computing device 102.

Token-Based Authentication for a Proxy Web Scraping Service

An API call from client computing device 102 may include credentials that enable a client to authenticate herself. Web scraping service 104 may subscribe clients at different service levels so it is important to authenticate the client when receiving API requests. Traditionally, web scraping systems may have had to re-authenticate the credentials at several points in the scraping process.

According to an embodiment, the credentials are authenticated at an entry point of the system where a token is generated that is passed along to various servers within web scraping system 104. The various servers within web scraping system 104 may use the token as a way to check the client's identity. With the client's identity confirmed, the various servers within web scraping system 104 can provide functions according to a service level to which the client has subscribed.

Figure 14:
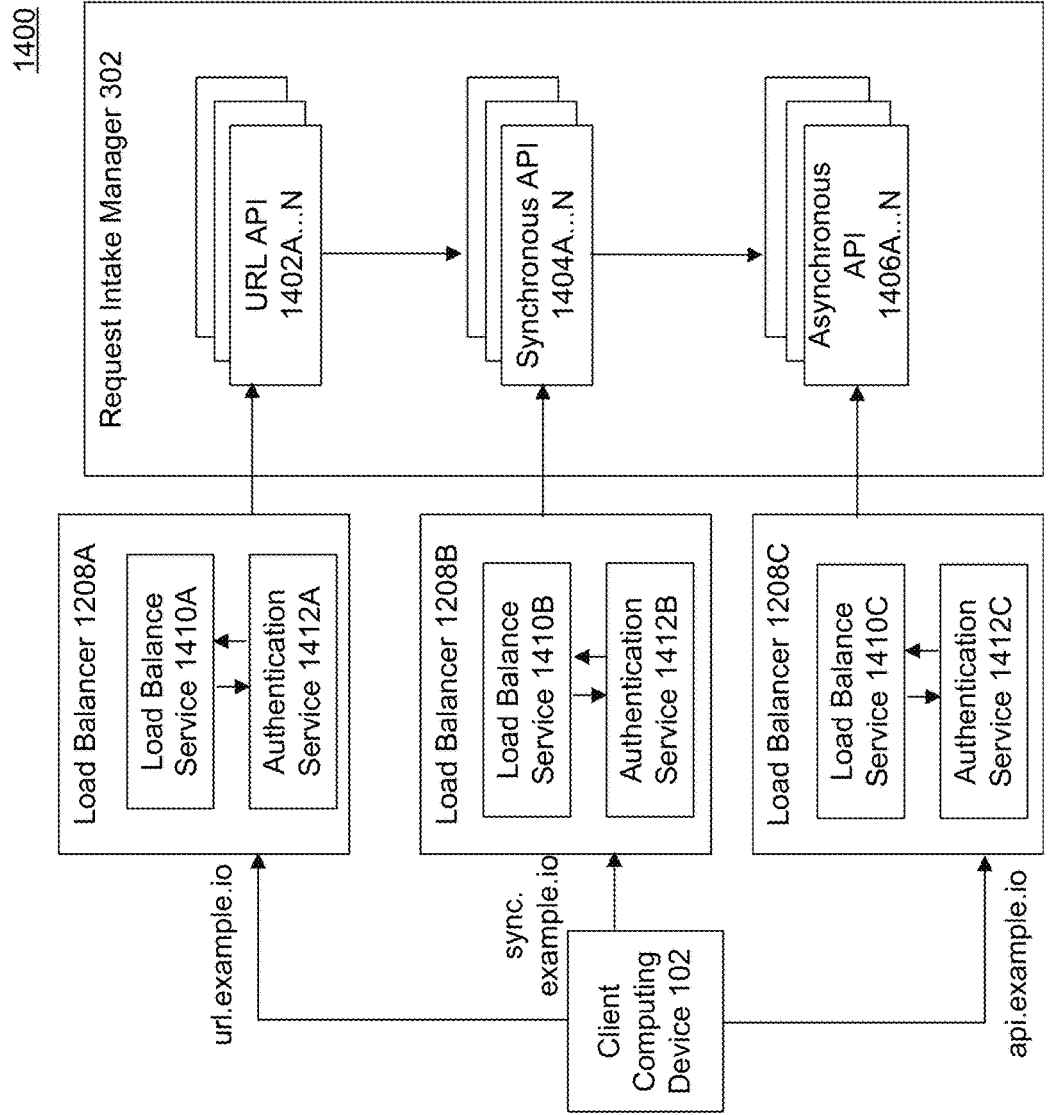
FIG. 14 illustrates a system for token-based authentication at a load balancer for a web scraping system.

FIG. 14 illustrates a system 1400 for token-based authentication at a load balancer for a web scraping system.

In system 1400, request intake manager 302 includes three sets of API receivers, each set of API receivers being a set of servers configured to accept a different type of web scraping request. URL API receiver 1402A . . . N accepts a web scraping request including a fully formatted URL. API receiver 1402A . . . N may accept API requests as HTTP proxy as described above. When such an HTTP proxy request is received at API receiver 1402A . . . N, the respective API receiver 1402A . . . N reformats the request according to an API with known parameters and sends the reformatted request to at least one of synchronous API receivers 1404A . . . N.

Synchronous API receiver 1404A . . . N is configured to accept a synchronous, that is, realtime, web scraping request. When a synchronous API receiver 1404A . . . N receives a web scraping request, it leaves the TCP/HTTP connection with the client computing device 102 open until the scraped results are available. Once web scraping system 104 has completed the scraping request, the respective synchronous API receiver 1404A . . . N returns the scraped results to client computing device 102. To conduct the web scraping request, synchronous API receiver 1404A . . . N may send the API request to at least one of asynchronous API receivers 1406A . . . N.

Asynchronous API receiver 1406A . . . N may be the entry point into the remainder of web scraping system 104 as described above. For example, as described above, asynchronous API receiver 1406A . . . N may generate a job description and send the job description to request status manager 304, which initiates the scraping job. When asynchronous API receiver 1406A . . . N receives an API request from client computing device 102 or from synchronous API receiver 1404A . . . N, asynchronous API receiver 1406A . . . N closes the connection to the receiver or device before the web scraping is complete, perhaps replying with an acknowledgment. Once the web scraping is complete and results are available at web scraping system 104, the client computing device 102 or synchronous API receiver 1404A . . . N receives a callback notification that results are available. In this way, an API request is passed between a plurality of servers, each configured to perform a function of web scraping system 104.

Each set of API receivers is accessible via a respective load balancers 1208A-C, and each of the respective load balancers 1208A-C may represent an entry point into web scraping system 104 for client computing device 102. As described above, each of load balancers 1208A-C distribute requests among the plurality of associated receivers to utilize and distribute requests across the multiple, parallel servers.

In the example in FIG. 14, a client desiring to send an API request using the full URL of the destination, such as using the Web proxy protocol as described above, may send the API request to a hostname "url.example.io." That request would reach load balancer 1208A. Load balancer 1208A selects one of URL API receivers 1402A . . . N to handle the request and forwards the API request on to the selected receiver. The selected API receiver 1402A . . . N reformats the proxy request into a different API format and sends on to one of synchronous API receivers 1404A . . . N, which forwards the requests on to one of asynchronous API receivers 1406A . . . N. When the request is completed and results are scraped, the selected synchronous API receiver 1404A . . . N is notified and returns scraped results to the selected URL API receiver 1402A . . . N. The selected URL API receiver 1402A . . . N formats the response as a proxy response and sends the response to client computing device 102.

Continuing the example operation in FIG. 14, a client desiring to send an API request using a synchronous API call may send the API request to a hostname "sync.example.io." That request would reach load balancer 1208B. Load balancer 1208B selects one of synchronous API receivers 1404A . . . N to handle the request and forwards the API request on to the selected receiver. The selected synchronous API receivers 1404A . . . N keeps the connection open while forwarding the API request to asynchronous API receiver 1406A . . . N, which sends the job for scraping. When the results are available, the selected synchronous API receiver 1404A . . . N is notified and returns the results to client computing device 102, closing the connection.

Finally, continuing the example operation in FIG. 14, a client desiring to send an
API request using an asynchronous API call may send the API request to a hostname "api.example.io." That request would reach load balancer 1208C. Load balancer 1208C selects one of asynchronous API receivers 1406A . . . N to handle the request and forwards the API request on to the selected receiver. The selected asynchronous API receivers 1404A . . . N close a connection between the web scraping system 104 and the client computing device while the web scraping system scrapes the target website.

According to an embodiment, each load balancer 1208A-C includes a respective Load balance service 1404A-C and authentication service 1412A-C. Load balance service 1404A-C performs the backend selection and proxy forwarding or redirection for the load balancer as described above. On receipt of a request, Load balance service 1404A-C communicates with the respective authentication service 1412A-C to authenticate the user.

In particular, each of authentication service 1412A-C is configured to validate credentials received with an API request from client computing device 102. When the authentication service 1412A-C cannot validate the credentials, the respective load balancer 1208A-C refuses to service received API request. When the authentication service 1412A-C validates the credentials, the authentication service 1412A-C generates a token indicating an identity of a client associated with the credentials. Load balancer 1208A-C transmits the API request along with the token to a server configured to initiate a scraping process on the web scraping request.

The token may be passed along with the API request to the various API receivers and other servers and modules providing functions within web scraping system 104. These various servers analyze the token to determine whether the client is authorized to conduct the function performed by the respective server, and when the client is authorized to conduct the function, perform the function, such as handling a particular type of API or conducting a particular type of scraping request. To conduct the analysis, a server may check the level of service of the client indicated within the token. Based on the level of service, the server may determine whether the function provided by the server is authorized. Moreover, when an API request is made to retrieve previously scraped results or to check status of a previously made request, a server may use the token to determine whether the previously-made request was made by the same client.

In addition to specifying the client, the token may specify a role for the client. Subsequent servers may use the role within the token to determine whether a particular function of web scraping system 104 is authorized. In an example, an "admin" role may allow the request made by any client, while a "user" role may allow the request to retrieve only the data requested by the authenticated client.

Figure 15:
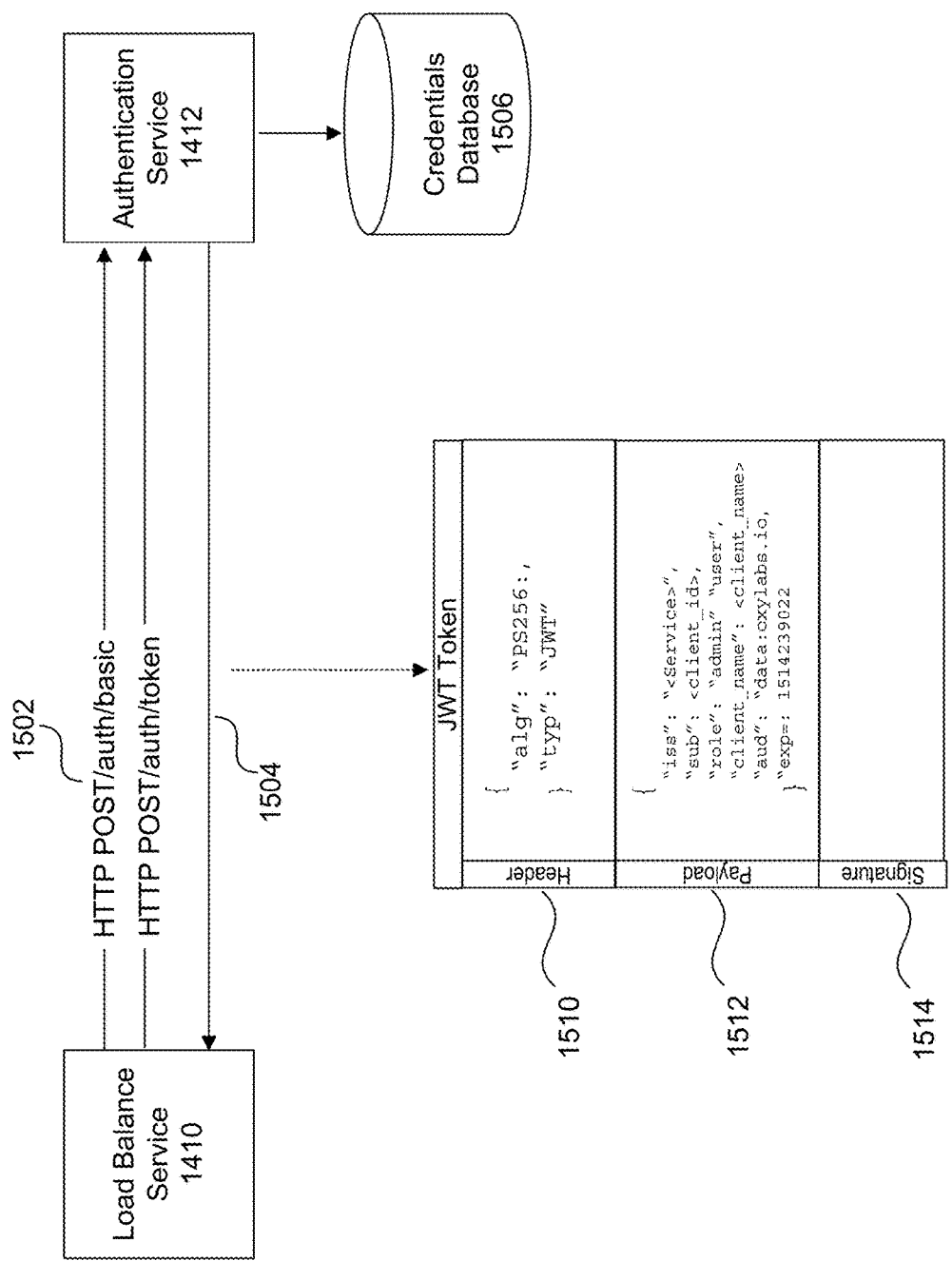
FIG. 15 illustrates token-based authentication for a web scraping system in greater detail.

FIG. 15 shows a system 1500 illustrating the operation of token-based authentication for a web scraping system 104 in greater detail. Load balance service 1410 makes a request 1502 of authentication service 1412. Request 1502 may, for example, be an HTTP POST request. The body of the post request may have credentials, and a path used by the POST request and may contain the type of credentials being used. Credentials, for example, may be a username and password. In another example, the credentials can be a token.

Authentication service 1412 compares the credentials to what is stored in a credentials database 1506. Credentials database 1506 may have multiple layers in a memory hierarchy to speed up lookup. Based on that comparison, authentication service 1412 generates and returns authentication token 1504.

In an example, token 1504 may be a JSON Web Token (JWT). Token 1504 includes a header 1510, payload 1512, and digital signature 1514. Header 1510 may indicate the algorithm and type used for the JSON. Payload 1512 may have data regarding the authentication. This can include the client's identity, services to which the client has subscribed, roles of the client, and expiration date/time for the token, and whether the authentication was successful.

Digital signature 1514 uses cryptographic methods to guarantee that the payload of the client has not been tampered with. For example, generating digital signature 1514 may involve generating a one-way hash and encrypting it with a private key of the authentication service 1412. Then, when digital signature 1514 is verified, the public key is used to decrypt the hash and compare it with a hash of the payload 1512. In this way, digital signature 1514 can be used to verify that the payload has not been tampered with by anyone who does not have possession of the private key.

Cold Database for Archiving Results of Web Scraping Across Data Centers

As mentioned above, web scraping system 104 may include a history archive 306 that stores the scraped data for longer periods. History archive 306 allows a user to track changes to a target website over time. To retrieve data, a client may request a dump from a history archive 306 of the previously scraped results that meet certain criteria. In particular, the client's search criteria may describe metadata of results sought to be retrieved. The metadata may be compared to an index that describes the results. Based on the index, links to the results may be returned to the client.

However, as described above, functionality of web scraping system 104 may be spread across multiple data centers. Each data center may have its own index. According to an embodiment, results from the various indexes are combined to generate search results corresponding to particular search criteria. Aspects of this feature are illustrated in FIG. 16.

Figure 16:
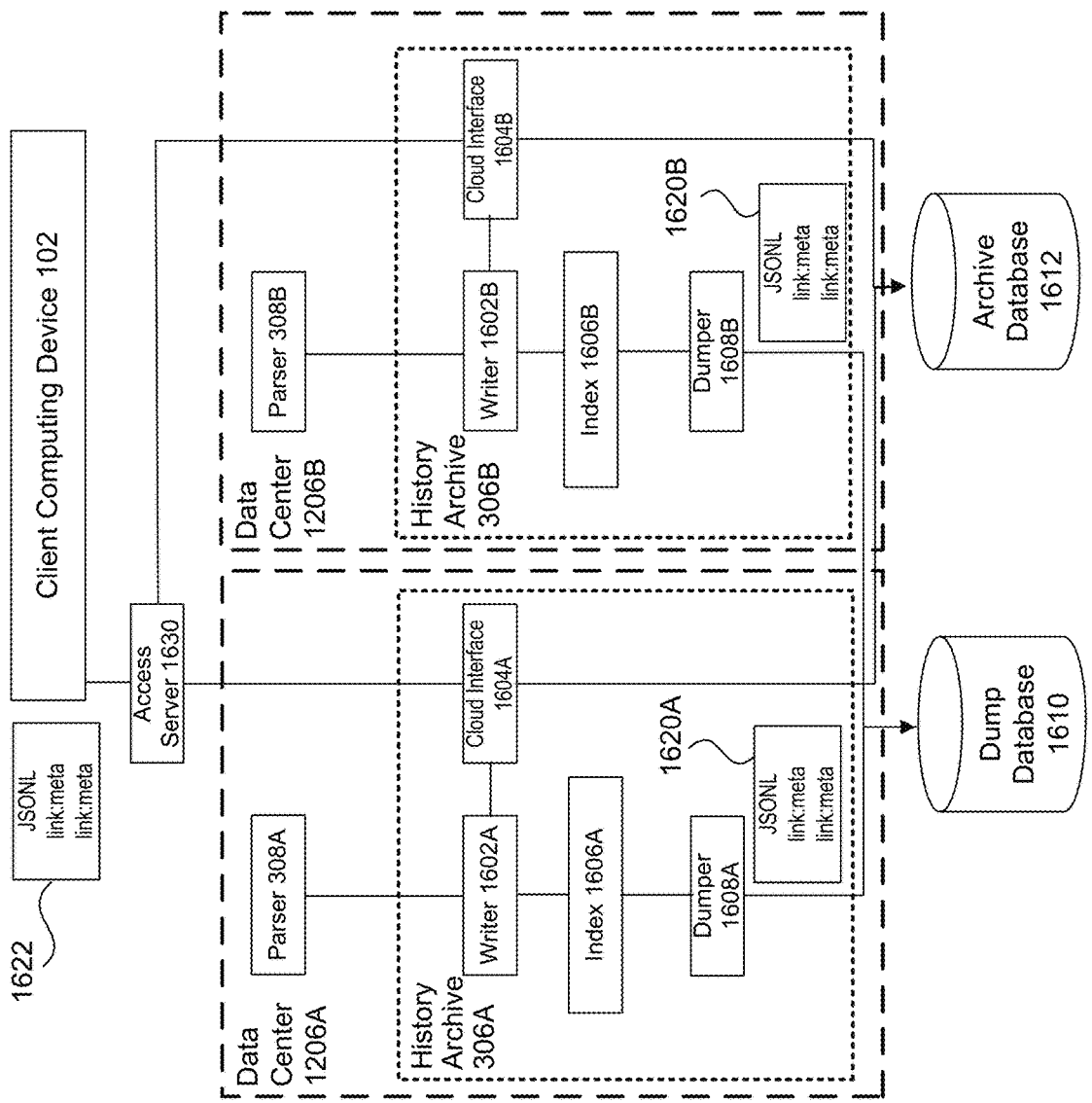
FIG. 16 illustrates a system that stores results from a plurality of data centers into an archive database.

FIG. 16 illustrates a system 1600 that stores results from a plurality of data centers into an archive database.

System 1600 includes an access server 1630 and an archive database 1612. In an example, archive database 1612 may store parsed data scraped by web scraping system 104. As an example, the parsed data retrieved for each web scraping request may be stored as a JSON file and written to archive database 1612. The web scraping system 104 stores the scraped data into archive database 1612, where it is available for future analysis.

To access data in archive database 1612, client computing device 102 may send a request to access server 1630. The request may address a location of the desired JSON file within archive database 1612. Access server 1630 retrieves data from archive database 1612 via one or more cloud interfaces 1604A-B. Cloud interfaces 1604A-B may have the credential and interface information needed to send and retrieve data from archive database 1612.

Archive database 1612 may be a cloud storage service. It may be an Infrastructure as a service (IaaS), it may utilize encryption for security and data compression for bandwidth, storage, and latency optimization. Similarly, dump database 1610 may also be a cloud storage database.

Each respective data center 1206A-B includes a scraper (not shown in FIG. 16), parser 308A-B, and history archive 306A-B. Each history archive 306A-B includes a writer 1602A-B, cloud interface 1604A-B, index 1606A-B, and dumper 1608A-B.

As described above with respect to FIGS. 3 and 4, the scraper is configured to generate a web request for a target website according to a job description generated based on an API request. The scraper transmits the generated web request to the target website via one or more proxies. In response to the web request, the scraper receives a content from the target website. Also as described above, parser 308A-B are each configured to parse the response from the target website. The parsed content may be represented, for example, as a data structure in a JSON format. Parser 308A-B sends the parsed content to the respective writer 1602A-B.

Once received from parser 308A-B, the respective writer 1602A-B sends the parsed content to the respective cloud interface 1604A-B to be written to archive database 1612. In addition, metadata about the scraped content is saved to index 1606A-B. The metadata may include, for example, any of the information in the corresponding API request or job description and a time stamp when the scraping actually occurred.

Information from a target website may only be stored in archive database 1612 at a particular frequency. In other words, if content is retrieved from a target website (with particular parameters, as set out in the job description) and was recently stored in archive database 1612, writer 1602A-B may decline to write it again. In this way, storage is conserved on archive database 1612.

To determine whether a writer 1602A-B has previously archived content from the target website, writer 1602A-B may compare metadata parameters with entries already existing in its respective index 1606A-B. Because the respective index 1606A-B may only have metadata of content stored from a particular data center, additional synchronization and de-duplication may need to occur as described below with respect to FIG. 17.

Having the index distributed across multiple data centers means that search criteria must be distributed across multiple servers to search all the indexes. If client computing device 102 wishes to retrieve a plurality of scraped results meeting certain criteria, client computing device 102 sends the search criteria to web scraping system 104. The search criteria is distributed among a plurality of data centers 1206A-B and is received by a respective dumper 1608A-B. The respective dumper 1608A-B searches the respective index 1606A-B at that data center and determines what entries in the index file satisfy the search criteria. In particular, each entry may have metadata describing the search results and the metadata for each entry which may be compared against the search criteria. The dumper 1608A-B sends the resulting list, including links to the location within archive database 1612 where the scraped results may be found, to a dump database 1610, where they are combined.

As shown in in FIG. 16, client computing device 102 reads the combined results as 1622 from dump database 1610. Then, client computing device 102 sends each individual link to access server 1630, which uses the address of the scraped results to retrieve the appropriate results from archive database 1612 and return the retrieved results to client computing device 102.

Figure 17:
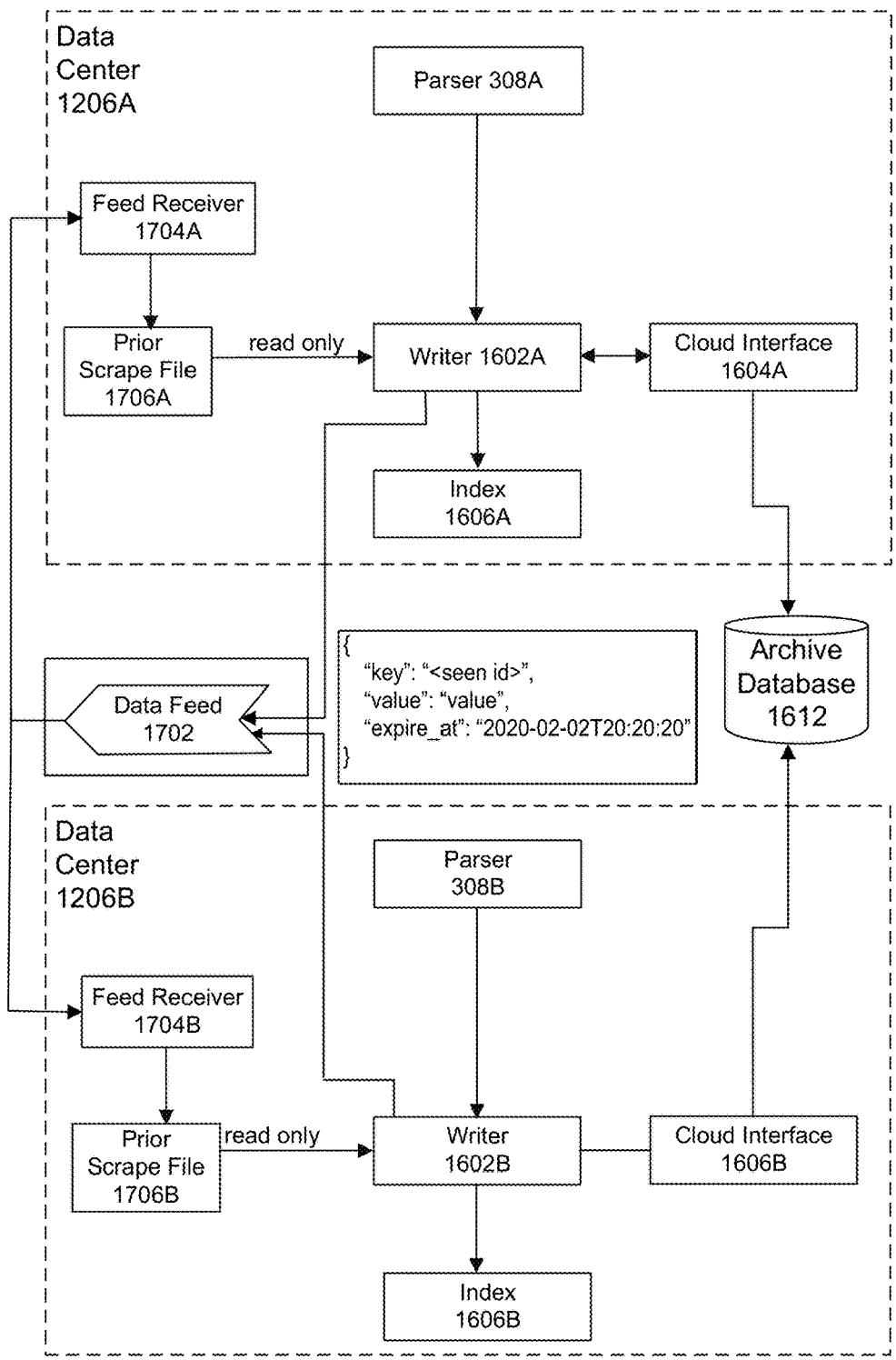
FIG. 17 illustrates a system that de-duplicates from a plurality of data centers before storing into an archive database.

FIG. 17 illustrates a system 1700 that de-duplicates data scraped from a plurality of data centers before storing into an archive database.

As mentioned above, when parsed, scraped content is stored in the archive, writer 1602A-B writes metadata describing the respective content into respective index file 1606A-B. At that time, writer 1602A-B will send the metadata to other data centers via a data feed 1702.

Data feed 1702 may be a software bus that uses stream-processing to distribute real-time data feeds. It may use a binary TCP-based protocol and may rely on "message set" obstruction which groups messages together to reduce the overhead of the network round trip.

Each respective data center includes a respective feed receiver 1704A-B. The feed receiver is configured to accept data feed 1702, streaming metadata from other data centers and storing it into the respective prior scraped file 1706A-B. Each metadata entry may be stored with an expiration date. The expiration date may be set based on the time period to preclude future scrapes from being archived, such as one month. When the expiration date occurs, the entry may be removed from the prior scraped file 1706A-B.

To determine whether another data center has previously retrieved the content from the target website and stored it in archive database 1612, the respective writer 1602A-B may compare metadata parameters with entries existing in its prior scraped file 1706A-B. In this way, duplications across data centers within archive database 1612 are avoided.

CONCLUSION

Each of the modules, servers and other components described above (including client computing device 102, web scraping system 104, Web proxy 106A . . . N, target Web server 108, scraper 310, parser 308, request intake manager 302, request status manager 304, central message queue 312, history archive 306, proxy rotator 486, target scraper 460 6A-N, message queue 454, notifier 460, external database writer 464, API receiver 402A-N, in memory access server 450, database servers 404A-N, message queue 454, micro service 456, throttler 502, throttle queue 702A . . . N, job remover 704, queue selector 716, invoice generator 808A, traffic counter 802, limit checker 804, database server selector 1100, load balancer 1208, data center balancer 1204, URL API receiver 1402A-N, synchronous API receiver 1404A-N, asynchronous API receiver 1406A-N, load balance service 1410A-C, authentication service 1412A-C, writer 1602A-B, cloud interface 1604A-B, dumper 1608A-B, and access server 1630) may be implemented on software executed on one or more computing devices or different computing devices.

A computing device may include one or more processors (also called central processing units, or CPUs). The processor may be connected to a communication infrastructure or bus. The computer device may also include user input/output device(s), such as monitors, keyboards, pointing devices, etc., which may communicate with communication infrastructure through user input/output interface(s).

One or more of the processors may be a graphics processing units (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer device may also include a main or primary memory 408, such as random access memory (RAM). Main memory 408 may include one or more levels of cache. Main memory 408 may have stored therein control logic (i.e., computer software) and/or data.

The computer device may also include one or more secondary storage devices or memory. The secondary memory may include, for example, a hard disk drive, flash storage and/or a removable storage device or drive.

The computing device may further include a communication or network interface. The communication interface may allow the computer system 400 to communicate and interact with any combination of external devices, external networks, external entities, etc. For example, the communication interface may allow the computer system to access external devices via network 100, which may be wired and/or wireless (or a combination thereof), and which may include any combination of LANs, WANs, the Internet, etc The computing device may also be any of a rack computer, server blade, personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer device may access or host any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computing devices may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards. Any of the databases or files described above (including job database 314 In-memory job table 452, HTML cache 462, throttle configuration database 714, traffic count database 806, database server status table 1008, credentials database 1506, archive database 1612, and dump database 1610) may be stored in any format, structure, or schema in any type of memory and in a computing device.

In some embodiments, a tangible, non-transitory apparatus or article of manufacture comprising a tangible, non-transitory computer-usable or readable medium having control logic (software) stored thereon may also be referred to herein as a computer program product or program storage device. This includes, but is not limited to, main memory, secondary memory, and removable storage units, as well as tangible articles of manufacture embodying any combination of the foregoing. Such control logic may cause such data processing devices to operate as described herein.

A website is a collection of web pages containing related contents identified by a common domain name and published on at least one web server. A domain name is a series of alphanumeric strings separated by periods, serving as an address for a computer network connection and identifying the owner of the address. Domain names consist of two main elements—the website's name and the domain extension (e.g., .com). Typically, websites are dedicated to a particular type of content or service. A website can contain hyperlinks to several web pages, enabling a visitor to navigate between web pages. Web pages are documents containing specific collections of resources that are displayed in a web browser. A web page's fundamental element is one or more text files written in Hypertext Markup Language (HTML). Each web page in a website is identified by a distinct URL (Uniform Resource Locator). There are many varieties of websites, each providing a particular type of content or service.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The disclosure presents a computer-implemented method for executing a plurality of web scraping requests over time, comprising:
- (a) during a first time period, receiving a plurality of web scraping requests from a client computing device, each of the plurality of web scraping requests specifying a target website to capture content from;
- (b) placing job descriptions for the plurality of web scraping requests on a queue, the job descriptions each describing at least one web scraping job specified by a request from the plurality of requests;
- (c) incrementally over a second time period longer than the first time period, removing the job descriptions from the queue;
- when each respective job description is removed from the queue:
  - (d) generating a web request for the target website as specified in the job description; and
  - (e) transmitting the web request such that the web request reaches the target website via a proxy selected from a group of proxies.

The method is presented wherein the removing (c) occurs in increments selected to avoid the group of proxies from becoming blocked by the target website.

The method is presented further comprising:
- (f) in response to the web request, receiving content transmitted from the target website; and
- (g) transmitting the received content to the client computing device.

The method is presented wherein the plurality of web scraping requests each include a client identifier indicating a client from which the web scraping request originates, further comprising:
- (f) selecting the queue from a plurality of queues based on the client identifier.

The method is presented wherein the plurality of web scraping requests each further include an identifier of the target website, further comprising:
- (g) selecting the queue from the plurality of queues based on the identifier of the target website.

The method is presented further comprising selecting the queue from the plurality of queues based on whether the job description specifies that web scraping be made from a headless browser.

The method is presented further comprising, when the job description requests that web scraping be made from the headless browser:
- (h) in response to the web request, receiving content specifying a web page, the content transmitted from the target website;
- (i) analyzing the content to determine web addresses for additional content needed to render the web page; and
- (j) requesting the additional content from the web addresses.

The method is presented wherein incrementally removing (c) comprises repeated removing a job description from the queue at a time window.

The method is presented wherein incrementally removing (c) comprises repeated removing a plurality of job descriptions from the queue at the time window.

The method is presented wherein an amount of job descriptions in the plurality of job descriptions are specified based on a client that sent the plurality of web scraping requests.

The method is presented further comprising:
- (f) determining that web scraping requests from the client computing device no longer need to be throttled;
- (g) determining when the queue is empty; and
- (h) when the queue is determined to be empty, deleting the queue.

The method is presented further comprising:
- (f) determining which of the plurality of web scraping requests are synchronous requests and which are asynchronous requests; and
- (g) prioritizing web scraping requests determined in (f) to be synchronous requests over web scraping requests determined in (f) to be asynchronous requests to help ensure that results from synchronous requests are returned before a connection with the client computing device times out.

A system is presented for executing a plurality of web scraping requests over time, comprising:
- at least one processor;
- a memory configured to store a queue;
- a request intake manager configured to, during a first time period, receive a plurality of web scraping requests from a client computing device, each of the plurality of web scraping requests specifying a target website to capture content from;
- a throttler configured to place job descriptions for the plurality of web scraping requests on the queue, the job descriptions each describing at least one web scraping job specified by a request from the plurality of requests;
- a job remover configured to, incrementally over a second time period longer than the first time period, remove the job descriptions from the queue;
- a scraper configured to, when each respective job description is removed from the queue, generate a web request for the target website as specified in the job description, and transmitting the web request such that the web request reaches the target website via a proxy selected from a group of proxies.

The system is presented wherein the job remover is configured to remove in increments selected to avoid the group of proxies from becoming blocked by the target website.

The system is presented wherein the scraper is configured to, in response to the web request, receive content transmitted from the target web site, and the request intake manager is configured to notify the client that the received content is available for transmission to the client computing device;

The system is presented further comprising a memory configured to store a plurality of queues, wherein the plurality of web scraping requests each include a client identifier indicating a client from which the client originates, further comprising:

a queue selector that selects the queue from a plurality of queues based on the client identifier.

The system is presented wherein the plurality of web scraping requests each further include an identifier of the target website, the queue selector is configured to select the queue from the plurality of queues based on the identifier of the target website.

The system is presented further comprising the queue selector configured to select the queue from the plurality of queues based on whether the job description specifies that web scraping be made from a headless browser.

The system is presented further comprising:
a throttle configuration database that stores a regular time window associated with the queue, wherein the job remover repeatedly removes a job description from the queue at the time window.

A non-transitory computer-readable device having instructions stored thereon is presented that, when executed by at least one computing device, cause the at least one computing device to perform operations comprising:
(a) during a first time period, receiving a plurality of web scraping requests from a client computing device, each of the plurality of web scraping requests specifying a target website to capture content from;
(b) placing job descriptions for the plurality of web scraping requests on a queue, the job descriptions each describing at least one web scraping job specified by a request from the plurality of requests;
(c) incrementally over a second time period longer than the first time period, removing the job descriptions from the queue;
when each respective job description is removed from the queue:
(d) generating a web request for the target website as specified in the job description; and
(e) transmitting the web request such that the web request reaches the target website via a proxy selected from a group of proxies.

A computer-implemented method for tracking user activity is presented, comprising:
(a) receiving a web scraping request from a client computing device, the web scraping request specifying a target web site to capture content from;
(b) based on the web scraping request, generating a web request for the target web site;
(c) transmitting the web request such that the web request reaches the target website via a proxy selected from a group of proxies;
(d) in response to the web request, receiving, via the proxy, content transmitted from the target web site;
(e) counting an amount of data in the received content to determine a current traffic total for a client of the client computing device; and transmitting the received content to the client computing device.

The method is presented, further comprising:
(g) based on the current traffic total, generating an invoice for a client corresponding to the client computing device.

The method is presented, wherein the current traffic total is for a time period, further comprising:
(g) receiving an additional web scraping request from the client computing device;
(h) determining whether the current traffic total exceeds a maximum allowable for a client corresponding to the client computing device; and when the current traffic total is determined to exceed the maximum allowable in (h), refusing to service the additional web scraping request.

The method is presented, wherein the current traffic total is for a time period, further comprising:
(g) receiving an additional web scraping request from the client computing device;
(h) determining whether the current traffic total exceeds a maximum allowable for a client corresponding to the client computing device; and
(i) when the current traffic total is determined to exceed the maximum allowable in (h), terminating the additional web scraping request.

The method is presented, further comprising:
(g) determining whether the target web site has refused to serve the web request from the proxy, wherein steps (b)-(f) are conducted when the target website is determined in (g) not to have refused to serve the web request from the proxy.

The method is presented, further comprising:
(i) when the target web site is determined in (g) to have refused to serve the web request from the proxy, retrying to send the web request to the target website via a different proxy.

The method is presented, further comprising:
(g) selecting a scraper from a plurality of scrapers based on the target web site such that the selected scraper includes instructions on how to generate the web request to extract data from the target web site,
wherein the generating (b) comprises generating the web request according to the instructions in the selected scraper, and
wherein the counting (e) comprises counting the amount of data in the received content to determine a current traffic total retrieved by the scraper for the client.

The method is presented, wherein the web request is a second web request, and the received content is a second content, further comprising:
(g) selecting a scraper from a plurality of scrapers based on the target web site such that the selected scraper includes instructions on how to generate a first web request and the second web request;
(f) generating the first web request for the target web site according to the instructions;
(g) transmitting the first web request such that the web request reaches the target website via the proxy; and
(h) in response to the first web request, receiving, via the proxy, a first content including a data transmitted from the target website via the proxy,
wherein the generating (b) comprises generating, based on the data, the second web request according to the instructions in the selected scraper.

The method is presented, wherein the counting (e) comprises excluding an amount of data in the first content to determine the current traffic total retrieved by the scraper for the client.

The method is presented, wherein the counting (e) comprises determining the amount of data in the received content as compressed for transmission.

The method is presented, wherein the counting (e) further comprises:
(i) determining a type of data represented by the received content;
(ii) based on the type of data, determining a compression factor representing an amount of compression expected when the type of data is transmitted over a network; and (ii) based on the compression factor, determining the amount of data in the received content as compressed for transmission.

The method is presented, further comprising:
(g) analyzing the content to determine web addresses for additional content needed to render a web page; and
(h) retrieving the additional content from the web addresses, wherein the counting (e) comprises including an amount of data in the additional content in the current traffic total for a client of the client computing device.

The method is presented, further comprising:
(g) receiving a request from a client corresponding to the client computing device for an amount of data remaining;
(h) determining the amount of data remaining as a difference between the current traffic total and a maximum allowable for the client; and
(i) returning the amount of data remaining to the client.

A non-transitory computer-readable device having instructions stored thereon is presented that, when executed by at least one computing device, cause the at least one computing device to perform operations, comprising:
(a) receiving a web scraping request from a client computing device, the web scraping request specifying a target web site to capture content from;
(b) based on the web scraping request, generating a web request for the target web site;
(c) transmitting the web request such that the web request reaches the target website via a proxy selected from a group of proxies;
(d) in response to the web request, receiving, via the proxy, content transmitted from the target web site;
(e) counting an amount of data in the received content to determine a current traffic total for a client of the client computing device; and transmitting the received content to the client computing device.

The device is presented, the operations further comprising:
(g) determining whether the target web site has refused to serve the web request from the proxy, wherein steps (b)-(f) are conducted when the target website is determined in (g) not to have refused to serve the web request from the proxy.

The device is presented, the operations further comprising:
(h) when the target web site is determined in (g) to have refused to serve the web request from the proxy, retrying to send the web request to the target website via a different proxy.

The device is presented, wherein the web request is a second web request, and the received content is a second content, further comprising:
(g) selecting a scraper from a plurality of scrapers based on the target web site such that the selected scraper includes instructions on how to generate a first web request and the second web request;
(h) generating the first web request for the target web site according to the instructions;
(i) transmitting the first web request such that the web request reaches the target website via the proxy; and
(j) in response to the first web request, receiving, via the proxy, a first content including a data transmitted from the target website via the proxy,
wherein the generating (b) comprises generating, based on the data, the second web request according to the instructions in the selected scraper wherein the counting (e) comprises excluding an amount of data in the first content to determine the current traffic total retrieved by the scraper for the client.

The device is presented, wherein the counting (e) comprises determining the amount of data in the received content as compressed for transmission.

The device is presented, wherein the counting (e) further comprises:
(i) determining a type of data represented by the received content;
(ii) based on the type of data, determining a compression factor representing an amount of compression expected when the type of data is transmitted over a network; and
(ii) based on the compression factor, determining the amount of data in the received content as compressed for transmission.

The device is presented, further comprising:
(g) analyzing the content to determine web addresses for additional content needed to render a web page; and
(h) retrieving the additional content from the web addresses,
wherein the counting (e) comprises including an amount of data in the additional content in the current traffic total for a client of the client computing device.

A computer-implemented method for determining which servers are available to process web scraping jobs is presented, comprising:
repeatedly checking health of each of a plurality of database servers;
based on the health checks, determine whether each of a plurality of database servers are to be enabled or disabled in a table, the plurality of database servers operating independently of one another, each database servers configured to manage data storage to at least a portion of a job database that stores the status of web scraping jobs while the web scraping jobs are being executed;
when a web scraping request is received from a client computing device:
selecting one of the database servers identified as enabled in the table; and
sending a job description specified by the web scraping request to the selected database server for storage in the job database as a pending web scraping job.

The method is presented, wherein each of the repeated checking comprises, for each of the plurality of database servers, connecting to the portion of the job database for the respective database server.

The method is presented, wherein each of the plurality of database servers comprises a message broker that queues job descriptions to be stored in the jobs database, and each of the repeatedly checking comprises, for each of the plurality of database servers, checking a connection between a server that receives web scraping requests from client computing devices and the respective database server's message broker.

The method is presented, wherein each of the plurality of database servers comprises a message broker that queues job descriptions to be stored in the jobs database, and each of the repeatedly checking comprises, for each of the plurality of database servers, checking a number of messages queued within the respective database server's message broker.

The method is presented, wherein each of the plurality of database servers is a shard managing storage in a horizontal partition of the jobs database.

The method is presented, wherein each of the plurality of database servers do not synchronize states to one another.

The method is presented, wherein the plurality of database servers are executed by a plurality of different computing devices.

The method is presented, further comprising:
determining whether a number of database servers that are disabled in the plurality of database servers exceeds a threshold; and
when the number of database servers that are disabled exceeds the threshold, alerting an administrator.

A non-transitory computer-readable device having instructions stored thereon is presented that, when executed by at least one computing device, cause the at least one computing device to perform operations, comprising:
repeatedly checking health each of a plurality of database servers;
based on the health checks, determining whether each of a plurality of database servers are to be enabled or disabled in a table, the plurality of database servers operating independently of one another, each database servers configured to manage data storage to at least a portion of a job database that stores the status of web scraping jobs while the web scraping jobs are being executed;
when a web scraping request is received from a client computing device:
selecting one of the database servers identified as enabled in the table; and
sending a job description specified by the web scraping request to the selected database server for storage in the job database as a pending web scraping job.

The device is presented, wherein each of the repeatedly checking comprises, for each of the plurality of database servers, connecting to the portion of the job database for the respective database server.

The device is presented, wherein each of the plurality of database servers comprises a message broker that queues job descriptions to be stored in the jobs database, and each of the repeatedly checking comprises, for each of the plurality of database servers, checking a connection between a server that receives web scraping requests from client computing devices and the respective database server's message broker.

The device is presented, wherein each of the plurality of database servers comprises a message broker that queues job descriptions to be stored in the jobs database, and each of the repeatedly checking comprises, for each of the plurality of database servers, checking a number of messages queued within the respective database server's message broker.

The device is presented, wherein each of the plurality of database servers is a shard managing storage in a horizontal partition of the jobs database.

The device is presented, wherein each of the plurality of database servers do not synchronize states to one another.

The device is presented, wherein the plurality of database servers are executed by a plurality of different computing devices.

The device is presented, further comprising:
determining whether a number of database servers that are disabled in the plurality of database servers exceeds a threshold; and
when the number of database servers that are disabled exceeds the threshold, alerting an administrator.

A system for determining which servers are available to process web scraping jobs is presented, comprising:
a processor;
a job database that stores the status of web scraping jobs while the web scraping jobs are being executed;
a memory that stores the job database;
a plurality of database servers operating independently of one another, each database servers configured to manage data storage to at least a portion of the job database;
a database monitor configured to repeatedly check health of each of the plurality of database servers and, based on the results of the health checks, determine whether each of the plurality of database servers are to be enabled or disabled in a table;
a database server selector configured to, when a web scraping request is received from a client computing device, select one of the database servers identified as enabled in the table; and
a request intake manager configured to send a job description specified by the web scraping request to the selected database server for storage in the job database as a pending web scraping job.

The system is presented, wherein the database monitor is configured to, for each of the plurality of database servers, check a connection between the request intake manager and the jobs database.

The system is presented, wherein each of the plurality of database servers comprises a message broker that queues job descriptions to be stored in the job database, and the database monitor is configured to, for each of the plurality of database servers, check a connection between a server that receives web scraping requests from client computing devices and the respective database server's message broker.

The system is presented, wherein each of the plurality of database servers comprises a message broker that queues job descriptions to be stored in the jobs database, and the database monitor is configured to, for each of the plurality of database servers, check a messages queued within the respective database server's message broker.

A computer-implemented method for distributing web scraping requests over a plurality of data centers is presented, comprising:
(a) receiving an API request from a client computing device, the API request relating to a web scraping job that was previously requested of a web scraping system;
(b) identifying a hostname addressing a host at a data center of a plurality of data centers executing the web scraping system, the data center servicing the web scraping job;
(c) directing the API request to the identified hostname; and
(d) at the identified data center, servicing the API request.

The method is presented, wherein the API request is a second API request, further comprising, at the identified data center:
receiving a first API request to request that the web scraping system scrape content from a target website via a proxy, wherein the first API request is received prior to the second API request;
generating a web request for the target website as specified in the first API request;
transmitting the web request such that the web request reaches the target website via a proxy selected from a group of proxies; and
in response to the web request, receiving scraped content from the target website via the proxy.

The method is presented, wherein the second API request is to retrieve state of the web scraping job specified by the API request.

The method is presented, wherein the second API request is to retrieve the received scraped content.

The method is presented, further comprising:
sending a message to the client computing device, the message specifying a sub-domain for the client computing device to retrieve the scraped content.

The method is presented, wherein the hostname addresses a load balancer that balances requests among a plurality of servers that accept web scraping requests.

The method is presented, wherein steps (a)-(c) are executed at a data center balancer that selects which data center of the plurality of data centers to service the web scraping job.

The method is presented, wherein the data center is at a first data center wherein steps (a)-(c) are executed at a second data center different from the first data center.

The method is presented, wherein the directing (c) comprises sending an instruction to the client computing device directing the client computing device to resend the API request to the sub-domain.

The method is presented, wherein the directing (c) comprises forwarding the API request to the sub-domain for the first data center processing the request, further comprising:
at the second data center, forwarding the scraped content from the first data center to the client computing device.

The method is presented, wherein the plurality of data centers executing the web scraping system each operate to accept job requests independently of one another, wherein status and results from the API request are stored on one of a plurality of independent, horizontally partitioned database shards.

A non-transitory computer-readable device having instructions stored thereon is presented that, when executed by at least one computing device, cause the at least one computing device to perform operations, the operations comprising:
(a) receiving an API request from a client computing device, the API request relating to a web scraping job that was previously requested of a web scraping system;
(b) identifying a hostname addressing a host at a data center of a plurality of data centers executing the web scraping system, the data center servicing the web scraping job; and
(c) directing the API request to the identified hostname for servicing at the identified data center.

The device is presented, wherein the API request is a second API request, further comprising, at the identified data:
receiving a first API request to request that the web scraping system scrape content from a target website via a proxy, wherein the first API request is received prior to the second API request;
generating a web request for the target website as specified in the first API request;
transmitting the web request such that the web request reaches the target website via a proxy selected from a group of proxies; and
in response to the web request, receiving scraped content from the target web site via the proxy.

The device is presented, wherein the second API request is to retrieve the received scraped content.

The device is presented, the operations further comprising:
sending a message to the client computing device, the message specifying the sub-domain for the client computing device to retrieve the scraped content.

The device is presented, wherein the plurality of data centers executing the web scraping system each operate to accept job requests independently of one another, wherein status and results from the API request are stored on one of a plurality of independent, horizontally partitioned database shards.

The device is presented, wherein the hostname addresses a load balancer that balances requests among a plurality of servers that accept web scraping requests.

A system for distributing web scraping requests over a plurality of data centers, comprising:
at least one processor and memory;
a data center balancer configured to (i) receive a first API request to scrape content from a target website and a second API request to retrieve the content once scraped, (ii) direct the first API request to a data center selected from a plurality of data centers, and (iii) direct the second API request to the data center; and
a request intake manager configured to (i) in response to the first API request, initiate web scraping from the target website and to (ii) in response to the second API request, return content scraped from the target website to a client computing device.

A system for distributing web scraping requests over a plurality of data centers, comprising:
at least one processor and memory;
a data center balancer configured to (i) receive a first API request to scrape content from a target website and a second API request to retrieve the content once scraped, (ii) direct the first API request to a first data center selected from a plurality of data centers, and (iii) direct the second API request to a second data center selected from the plurality of data centers;
a first request intake manager executed at the first data center, the first request intake manager configured to (i) in response to the first API request, initiate web scraping from the target website and to (ii) in response to the second API request, return content scraped from the target website to a client computing device; and
a second request intake manager executed at the second data center, the second request intake manager configured to in response to the second API request, (i) determine which of the plurality of data centers processed the first API request, and to (ii) direct the second API request to the determined data center.

The system is presented further comprising:
a first load balancer executed at the first data center, the first load balancer configured to, in response to the first API request: (i) select the first request intake manager from a first plurality of first request intake managers executed at the first data center, and (ii) direct the first API request to the selected first request intake manager; and
a second load balancer executed at the second data center, the second load balancer configured to, in response to the second API request: (i) select the second request intake manager from a second plurality of first request intake managers executed at the second data center, and (ii) direct the second API request to the selected second request intake manager;

A computer-implemented method for securing a web scraping system is presented, comprising:
at an entry point to the web scraping system, performing the following:
(a) validating credentials received with an API request from a client computing device, the API request asking that the web scraping system scrape content from a target website;

(b) when the credentials are validated, generating a token indicating an identity of a client associated with the credentials;

(c) transmitting the API request along with the token to a server configured to initiate a scraping process on the web scraping system;

at the server configured to initiate the web scraping system:

(d) analyzing the token to determine whether the client is authorized to conduct the request; and (e) when the client is authorized, causing the web scraping system to scrape the target web site.

The method is presented, further comprising:

(f) passing the API request between a plurality of servers, each configured to perform a function of the web scraping system, the server configured to initiate the web scraping system being included in the plurality of servers;

at each of the respective servers:

(g) analyzing the token to determine whether the client is authorized to conduct the function performed by the respective server; and (e) when the client is authorized to conduct the function, performing the function.

The method is presented, wherein the plurality of servers includes a server configured to service API requests formatted as a web proxy request.

The method is presented, wherein the plurality of servers includes a server configured to service synchronous API requests, leaving a connection between the web scraping system and the client computing device open while the web scraping system scrapes the target website.

The method is presented, wherein the plurality of servers includes a server configured to service asynchronous API requests, closing a connection between the web scraping system and the client computing device before the web scraping system scrapes the target web site.

The method is presented, wherein the generating (b) comprises generating the token to include a role of the client.

The method is presented, wherein the generating (b) comprises generating the token to include a digital signature that cryptographically guarantees that the identity of the client has not been tampered with.

The method is presented, wherein the API request is a first API request, and the token is a first token, further comprising:

(g) validating credentials received with a second API request, the second API request asking to retrieve content that the web scraping system has previously scraped from the target website;

(g) when the credentials are validated, generating a second token indicating an identity of a client associated with the credentials received with the second API request;

(h) determining whether the first and second tokens indicate that the first and second API requests came from the client; and (i) when the first and second tokens indicate that the first and second API requests came from the client, returning the scraped content in response to the second API request.

The method is presented, further comprising, when the first and second tokens do not indicate that the first and second requests came from the client, refusing to return the scraped content.

The method is presented, wherein the entry point is a load balancer that selects the server from a plurality of parallel servers.

A non-transitory computer-readable device having instructions stored thereon is presented that, when executed by at least one computing device, cause the at least one computing device to perform operations, the operations comprising:

at an entry point to a web scraping system, performing the following:

(a) validating credentials received with an API request from a client computing device, the API request asking that the web scraping system scrape a target web site;

(b) when the credentials are validated, generating a token indicating an identity of a client associated with the credentials;

(c) transmitting the API request along with the token to a server configured to initiate a scraping process on the web scraping system;

at the server configured to initiate the web scraping system:

(d) analyzing the token to determine whether the client is authorized to conduct the request; and (e) when the client is authorized, causing the web scraping system to scrape the target website.

The device is presented, the operations further comprising:

(f) passing the API request between a plurality of servers, each configured to perform a function of the web scraping system, the server configured to initiate the web scraping system being included in the plurality of servers;

at each of the respective servers:

(g) analyzing the token to determine whether the client is authorized to conduct the function performed by the respective server; and (e) when the client is authorized to conduct the function, performing the function.

The device is presented, wherein the plurality of servers includes a server configured to service API requests formatted as a web proxy request.

The device is presented, wherein the plurality of servers includes a server configured to service synchronous API requests, leaving a connection between the web scraping system and the client computing device open while the web scraping system scrapes the target website.

The device is presented, wherein the plurality of servers includes a server configured to service asynchronous API requests, closing a connection between the web scraping system and the client computing device before the web scraping system scrapes the target web site.

The device is presented, wherein the generating (b) comprises generating the token to include a role of the client.

The device is presented, wherein the generating (b) comprises generating the token to include a digital signature that cryptographically guarantees that the identity of the client has not been tampered with.

The device is presented, wherein the API request is a first API request, and the token is a first token, the operations further comprising:

(f) validating credentials received with a second API request, the second API request asking to retrieve content that the web scraping system has previously scraped from the target website;

(g) when the credentials are validated, generating a second token indicating an identity of a client associated with the credentials received with the second API request;

(h) determining whether the first and second tokens indicate that the first and second requests came from the client; and (e) when the first and second tokens indicate that the first and second requests came from the client, returning the scraped content in response to the second API request.

The device is presented, the operations further comprising, when the first and second tokens do not indicate that the first and second requests came from the client, refusing to return the scraped content.

The device is presented, wherein the entry point is a load balancer that selects the server from a plurality of parallel servers.

A method for aggregating web results scraped from a plurality of data centers is presented, comprising:

at a first data center of the plurality of data centers, comprising:

(a) generating a first web request for a target website;

(b) transmitting the first web request to the target web site;

(c) in response to the first web request, receiving a first content from the target web site;

(d) storing the first content in an archive;

(e) storing a first entry in a first index file, the first entry including metadata describing the first content and a first link addressing the first content in the archive;

(f) analyzing a search request from a client to determine that search criteria in the search request describes the metadata in the first entry;

at a second data center of the plurality of data centers:

(g) generating a second web request for the target website;

(h) transmitting the second web request to the target web site;

(i) in response to the second web request, receiving a second content from the target website;

(j) storing the second content in the archive;

(k) storing a second entry in a second index file, the second entry including metadata describing the second content and a second link addressing the second content in the archive;

(l) analyzing the search request from the client to determine that the search criteria in the search request describes the metadata in the second entry; and (m) in response to the analyzing (f) and (l), providing to the client a file with the first and second links.

The method is presented, wherein the providing (m) comprises:

storing the file in a database separate from the archive; and providing the client read access to the database.

The method is presented, wherein the file includes the metadata of the first and second entries.

The method is presented, further comprising:

(n) parsing a response from the target web site to the first web request to determine the first content; and (o) parsing a response from the target web site to the second web request to determine the second content.

The method is presented, further comprising:

(n) determining whether the steps (a)-(e) have occurred during a recent time period, wherein steps (j)-(k) occur only when the steps (a)-(e) have not occurred during the recent time period.

The method is presented, wherein the determining (n) comprises, at the second data center:

(i) receiving, from the first data center, a data feed with additions to the first index file;

(ii) storing the additions in a prior scraped file; and (ii) comparing the metadata describing the second content to the prior scraped file.

The method is presented, further comprising removing metadata from the prior scraped file at an expiration date selected based on the recent time period.

A non-transitory computer-readable device having instructions stored thereon is presented that, when executed by at least one computing device, cause the at least one computing device to perform operations, the operations comprising:

at a first data center of the plurality of data centers, comprising:

(a) generating a first web request for a target website;

(b) transmitting the first web request to the target web site;

(c) in response to the first web request, receiving a first content from the target web site;

(d) storing the first content in an archive;

(e) storing a first entry in a first index file, the first entry including metadata describing the first content and a first link addressing the first content in the archive;

(f) analyzing a search request from a client to determine that search criteria in the search request describes the metadata in the first entry;

at a second data center of the plurality of data centers:

(g) generating a second web request for the target website;

(h) transmitting the second web request to the target web site;

(i) in response to the second web request, receiving a second content from the target website;

(j) storing the second content in the archive;

(k) storing a second entry in a second index file, the second entry including metadata describing the second content and a second link addressing the second content in the archive;

(l) analyzing the search request from the client to determine that the search criteria in the search request describes the metadata in the second entry; and (m) in response to the analyzing (f) and (l), providing to the client a file with the first and second links.

The device is presented, wherein the providing (m) comprises:

storing the file in a database separate from the archive; and providing the client read access to the database.

The device is presented, wherein the file includes the metadata of the first and second entries.

The device is presented, the operations further comprising:

(n) parsing a response from the target web site to the first web request to determine the first content; and (o) parsing a response from the target web site to the second web request to determine the second content.

The device is presented, the operations further comprising:
(n) determining whether the steps (a)-(e) have occurred during a recent time period, wherein steps (j)-(k) occur only when the steps (a)-(e) have not occurred during the recent time period.

The device is presented, wherein determining (n) comprises, at the second data center:
(i) receiving, from the first data center, a data feed with additions to the first index file;
(ii) storing the additions in a prior scraped file; and
(ii) comparing the metadata describing the second content to the prior scraped file.

The device is presented, the operations further comprising removing metadata from the prior scraped file at an expiration date selected based on the recent time period.

A system for aggregating web results scraped from a plurality of data centers is presented, comprising:
a processor;
at least one memory;
an archive database stored in the at least one memory;
a first index file stored in at least one memory at a first data center;
a first scraper at the first data center, the first scraper configured to (i) generate a first web request for a target web site, (ii) transmit the first web request to the target web site, and (iii) in response to the first web request, receive a first content from the target web site;
a first writer at the first data center, the first writer configured to (i) store the first content in an archive and (ii) store a first entry in a first index file, the first entry including metadata describing the first content and a first link addressing the first content in the archive;
a first dumper at the first data center, the first dumper configured to analyze a search request from a client to determine that search criteria in the search request describes the metadata in the first entry;
a second index file stored in the at least one memory at a second data center;
a second scraper at the second data center, the second scraper configured to (i) generate a second web request for the target web site, (ii) transmit the second web request to the target web site, and (iii) in response to the second web request, receiving a second content from the target web site;
a second writer at the second data center, the second writer configured to (i) store the second content in an archive and (ii) store a second entry in a second index file, the second entry including metadata describing the second content and a second link addressing the second content in the archive;
a second dumper at the second data center, the second dumper configured to analyze the search request from the client to determine that the search criteria in the search request describes the metadata in the second entry; and a dump database configured to provide to the client a file with the first and second links.

The system is presented, wherein the file includes the metadata of the first and second entries.

The system is presented, the operations further comprising:
a first parser at the first data center, the first parser configured to parse a response from the target web site to the first web request to determine the first content; and
a second parser at the second data center, the second parser configured to parse a response from the target web site to the second web request to determine the second content.

The system is presented, wherein the second writer is configured to determine whether the first writer has recorded the target web site in the archive during a recent time period, wherein the second writer is configured to record the target website in the archive only when the first writer has not during the recent time period.

The system is presented, wherein further comprising, at the second data center:
a prior scraped file stored in the at least one memory;
a feed receiver configured to receive, from the first data center, a data feed with additions to the first index file and to storing the additions in the prior scraped file, wherein the writer is configured to compare the metadata describing the second content to the prior scraped file.

The system is presented, wherein metadata is removed from the prior scraped file at an expiration date selected based on the recent time period.

A method for scraping web results via a proxy is presented, comprising:
(a) receiving an API request from a client computing device, the API request specifying a target web site to scrape;
(b) based on the target website, selecting a scraper specifying how to generate a sequence of HTTP requests to access content requested by the API request;
(c) based on the selected scraper and received API request, generating an earlier HTTP request in the sequence of HTTP requests;
(d) transmitting, to the target website and via a proxy selected from a group of proxies, the earlier HTTP request;
(e) receiving, from the target web site and via the proxy selected from the group of proxies, a response to the earlier HTTP request, the response including session data;
(f) based on the selected scraper and received API request, generating a later HTTP request in the sequence of HTTP requests such that the later HTTP request includes the session data;
(g) receiving, from the target web site and via the proxy selected from the group of proxies, from the a response to the later HTTP request, the response including the scraped web results; and
(h) transmitting to the client computing device the scraped web results.

A method as in any of the above claims is presented, further comprising:
according to the API request and the selected scraper, generating a path to use in the earlier HTTP request.

A method as in any of the above methods is presented, wherein the API request specifies a geographic location, further comprising:
selecting the proxy based on the group of proxies such that an IP address of the selected proxy is located in the geographic location.

A method as in any of the above claims, wherein the API request specifies a geographic location, further comprising:
determining at least one header value to use in the earlier and later HTTP requests such that the at least one header identifies to the target website that the earlier and later HTTP requests originated from the geographic location.

A method as in any of the above methods is presented, further comprising:
    determining at least one header value to use in the earlier and later HTTP requests to mimic what a browser at the proxy would generate.

A method as in any of the above claims, further comprising:
    determining whether the target website as requested in the API request has been recently scraped from the target website and the recent scraped results stored in a cache;
    when the recent scraped results are determined not to be stored in the cache, executing steps (b)-(h); and
    when the recent scraped results are determined to be stored in the cache, transmitting the recently scraped results as a response to the API request.

A method as in any of the above methods is presented, wherein the API request is an HTTP request from the client computing device, wherein the transmitting (h) comprises transmitting the scraped web results as an HTTP response to the HTTP request from the client computing device.

A method as in any of the above methods is presented, when the receiving (g) is complete transmitting, to the client computing device, a callback message.

A method as in any of the above claims, wherein the API request is an HTTP proxy protocol request, and wherein the transmitting (h) comprises transmitting the scraped results as a response to the HTTP proxy protocol request.

A method as in any of the above methods is presented, further comprising:
    retrieving, by a headless browser, additional content that would be needed to render a web page specified by the scraped results.

A method as in any of the above methods is presented, further comprising:
    selecting the proxy from the group of proxies to prevent any proxy from the group of proxies from being identified as a bot.

A method as in any of the above methods is presented, the API request specifying a user-agent, further comprising:
    determining at least one header value to use in the earlier and later HTTP requests to mimic the user agent.

A method as in any of the above methods is presented, further comprising:
    receiving both synchronous and asynchronous API requests to scrape web data; and
    prioritizing processing of the synchronous API requests above processing of the asynchronous API requests.

A method as in any of the above methods is presented, wherein the response to the earlier HTTP request includes an HTML, page with a form to submit information to a URI, wherein the later HTTP request includes a path with the URI.

A method as in any of the above methods is presented, wherein the API request includes a value, wherein the response to the earlier HTTP request includes an HTML page with a form with a parameter name, wherein the later HTTP request indicates that the parameter name corresponds to the value.

A method as in any of the above methods is presented, wherein the API request includes a value matched to one of several parameter names, further comprising normalizing the API request to a common format.

A method as in any of the above methods is presented, further comprising generating a job identifier based on a server servicing the API request.

A method as in any of the above methods is presented, further comprising storing status of a web scraping job specified in the API request in an in-memory table.

A method as in any of the above methods is presented, further comprising storing status of a web scraping job in a horizontally partitioned database.

A system for scraping web results via a proxy in presented, comprising:
    a means for receiving an API request from a client computing device, the API request specifying a target website to scrape;
    a means for, based on the target website, selecting a scraper specifying how to generate a sequence of HTTP requests to access content requested by the API request;
    a means for, based on the selected scraper and received API request, generating an earlier HTTP request in the sequence of HTTP requests;
    a means for transmitting, to the target website and via a proxy selected from a group of proxies, the earlier HTTP request;
    a means for receiving, from the target website and via the proxy selected from the group of proxies, a response to the earlier HTTP request, the response including a session data;
    a means for, based on the selected scraper and received API request, generating a later HTTP request in the sequence of HTTP requests such that the later HTTP request includes the session data;
    a means for receiving, from the target website and via the proxy selected from the group of proxies, from the a response to the later HTTP request, the response including the scraped web results; and
    a means for transmitting to the client computing device the scraped web results.

What is claimed is:

1. A method for aggregating web results scraped by a plurality of data centers, comprising:
    at a first data center of the plurality of data centers, comprising:
        (a) generating a first web request for a target website;
        (b) transmitting the first web request to the target website;
        (c) in response to the first web request, receiving a first content from the tareget website;
        (d) storing the first content in an archive;
        (e) storing a first entry in a first index file, the first entry including metadata describing the first content and a first link addressing the first content in the archive;
    at a second data center of the plurality of data centers:
        (f) generating a second web request for the target website;
        (g) transmitting the second web request to the target website;
        (h) in response to the second web request, receiving a second content from the target website;
        (i) storing the second content in the archive;
        (j) storing a second entry in a second index file, the second entry including metadata describing the second content and a second link addressing the second content in the archive;
        (k) at an access server, receiving a search request from a client;
        (l) in response to the search request and at the first data center, analyzing the search request to determine that search criteria in the search request describes the metadata in the first entry;

(m) in response to the search request and at the second data center, analyzing the search request from the client to determine that the search criteria in the search request describes the metadata in the second entry; and (n) in response to the analyzing (l) and (m) and from the accessserver, providing to the client a file with the first and second links.

2. The method of claim 1, wherein the providing (n) comprises:
   storing the file in a database separate from the archive; and
   providing the client read access to the database.

3. The method of claim 1, wherein the file includes the metadata of the first and second entries.

4. The method of claim 1, further comprising:
   (o) parsing a response from the target website to the first web request to determine the first content; and
   (p) parsing a response from the target website to the second web request to determine the second content.

5. The method of claim 1, further comprising:
   (o) determining whether the steps (a)-(e) have occurred during a recent time period, wherein steps (i)-(j) occur only when the steps (a)-(e) have not occurred during the recent time period.

6. The method of claim 5, wherein the determining (o) comprises, at the second data center:
   (i) receiving, from the first data center, a data feed with additions to the first index file;
   (ii) storing the additions in a prior scraped file; and
   (iii) comparing the metadata describing the second content to the prior scraped file.

7. The method of claim 6, further comprising removing metadata from the prior scraped file at an expiration date selected based on the recent time period.

8. A non-transitory computer-readable device having instructions stored thereon that, when executed by at least one computing device, cause the at least one computing device to perform operations, the operations comprising:
   at a first data center of a plurality of data centers, comprising:
      (a) generating a first web request for a target website;
      (b) transmitting the first web request to the target web site;
      (c) in response to the first web request, receiving a first content from the target web site;
      (d) storing the first content in an archive;
      (e) storing a first entry in a first index file, the first entry including metadata describing the first content and a first link addressing the first content in the archive;
   at a second data center of the plurality of data centers:
      (f) generating a second web request for the target web site;
      (g) transmitting the second web request to the target web site;
      (h) in response to the second web request, receiving a second content from the target website;
      (i) storing the second content in the archive;
      (j) storing a second entry in a second index file, the second entry including metadata describing the second content and a second link addressing the second content in the archive;
      (k) at an access server, receiving a search request from a client;
      (l) in response to the search request and at the first data center, analyzing the search request to determine that search criteria in the search request describes the metadata in the first entry;
      (m) in response to the search request and at the second data center, analyzing the search request from the client to determine that the search criteria in the search request describes the metadata in the second entry; and
      (n) in response to the analyzing (1) and (m) and from the access server, providing to the client a file with the first and second links.

9. The device of claim 8, wherein the providing (n) comprises:
   storing the file in a database separate from the archive; and
   providing the client read access to the database.

10. The device of claim 8, wherein the file includes the metadata of the first and second entries.

11. The device of claim 8, the operations further comprising:
   (o) parsing a response from the target website to the first web request to determine the first content; and
   (p) parsing a response from the target website to the second web request to determine the second content.

12. The device of claim 8, the operations further comprising:
   (o) determining whether the steps (a)-(e) have occurred during a recent time period, wherein steps (i)-(j) occur only when the steps (a)-(e) have not occurred during the recent time period.

13. The device of claim 12, wherein determining (o) comprises, at the second data center:
   (i) receiving, from the first data center, a data feed with additions to the first index file;
   (ii) storing the additions in a prior scraped file; and
   (iii) comparing the metadata describing the second content to the prior scraped file.

14. The device of claim 13, the operations further comprising removing metadata from the prior scraped file at an expiration date selected based on the recent time period.

15. A system for aggregating web results scraped from a plurality of data centers, comprising:
   a processor;
   at least one memory;
   an archive database stored in the at least one memory;
   a first index file stored in at least one memory at a first data center;
   a first scraper at the first data center, the first scraper configured to (i) generate a first web request for a target web site, (ii) transmit the first web request to the target web site, and (iii) in response to the first web request, receive a first content from the target web site;
   a first writer at the first data center, the first writer configured to (i) store the first content in an archive and (ii) store a first entry in a first index file, the first entry including metadata describing the first content and a first link addressing the first content in the archive;
   a first dumper at the first data center;
   a second index file stored in at least one memory at a second data center;
   a second scraper at the second data center, the second scraper configured to (i) generate a second web request for the target web site, (ii) transmit the second web request to the target web site, and (iii) in response to the second web request, receiving a second content from the target web site;
   a second writer at the second data center, the second writer configured to (i) store the second content in an archive and (ii) store a second entry in the second index file, the second entry including metadata describing the second content and a second link addressing the second content in the archive;

an access server configured to receive a search request from a client;

wherein, in response to the search request, the first dumper at the first data center is configured to analyze the search request to determine that search criteria in the search request describes the metadata in the first entry;

a second dumper at the second data center, the second dumper configured to analyze the search request from the client to determine that the search criteria in the search request describes the metadata in the second entry in response to the search request; and a dump database configured to provide to the client a file with the first and second links.

16. The system of claim 15, wherein the file includes the metadata of the first and second entries.

17. The system of claim 15, the operations further comprising:

a first parser at the first data center, the first parser configured to parse a response from the target website to the first web request to determine the first content; and a second parser at the second data center, the second parser configured to parse a response from the target website to the second web request to determine the second content.

18. The system of claim 15, wherein the second writer is configured to determine whether the first writer has recorded the target website in the archive during a recent time period, wherein the second writer is configured to record the target website in the archive only when the first writer has not during the recent time period.

19. The system of claim 15, wherein further comprising, at the second data center:

a prior scraped file stored in the at least one memory;

a feed receiver configured to receive, from the first data center, a data feed with additions to the first index file and to storing the additions in the prior scraped file, wherein the writer is configured to compare the metadata describing the second content to the prior scraped file.

20. The system of claim 15, wherein metadata is removed from a prior scraped file at an expiration date selected based on a recent time period.

* * * * *

UNITED STATES PATENT AND TRADEMARK OFFICE
CERTIFICATE OF CORRECTION

PATENT NO. : 11,416,564 B1
APPLICATION NO. : 17/373634
DATED : August 16, 2022
INVENTOR(S) : Vilcinskas et al.

It is certified that error appears in the above-identified patent and that said Letters Patent is hereby corrected as shown below:

In the Claims

In Column 55, Line 7, replace "accessserver, providing to the client a file with the" with --access server, providing to the client a file with the--.

In Column 55, Lines 44-45, replace "web site" with --website--.

In Column 55, Line 47, replace "web site" with --website--.

In Column 55, Line 56, replace "web site" with --website--.

In Column 56, Lines 47-51, replace "a first scraper at the first data center, the first scraper configured to (i) generate a first web request for a target web site, (ii) transmit the first web request to the target web site, and (iii) in response to the first web request, receive a first content from the target web site" with --a first scraper at the first data center, the first scraper configured to (i) generate a first web request for a target website, (ii) transmit the first web request to the target website, and (iii) in response to the first web request, receive a first content from the target website--.

In Column 56, Lines 60-65, replace "second scraper at the second data center, the second scraper configured to (i) generate a second web request for the target web site, (ii) transmit the second web request to the target web site, and (iii) in response to the second web request, receiving a second content from the target web site" with --second scraper at the second data center, the second scraper configured to (i) generate a second web request for the target website, (ii) transmit the second web request to the target website, and (iii) in response to the second web request, receiving a second content from the target website--.

Signed and Sealed this
Tenth Day of October, 2023

Katherine Kelly Vidal
*Director of the United States Patent and Trademark Office*